US012323462B2

(12) United States Patent
Chang et al.

(10) Patent No.: US 12,323,462 B2
(45) Date of Patent: *Jun. 3, 2025

(54) IDENTIFYING LEGITIMATE WEBSITES TO REMOVE FALSE POSITIVES FROM DOMAIN DISCOVERY ANALYSIS

(71) Applicant: Proofpoint, Inc., Sunnyvale, CA (US)

(72) Inventors: Hung-Jen Chang, Freemont, CA (US); Gaurav Mitesh Dalal, Fremont, CA (US); Ali Mesdaq, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,625

(22) Filed: Mar. 5, 2024

(65) Prior Publication Data

US 2025/0016198 A1    Jan. 9, 2025

Related U.S. Application Data

(63) Continuation of application No. 17/992,180, filed on Nov. 22, 2022, now Pat. No. 11,956,272, which is a
(Continued)

(51) Int. Cl.
*H04L 9/40* (2022.01)
*G06F 16/957* (2019.01)
(Continued)

(52) U.S. Cl.
CPC ...... *H04L 63/1483* (2013.01); *G06F 16/9577* (2019.01); *G06F 40/205* (2020.01);
(Continued)

(58) Field of Classification Search
CPC ............. H04L 63/1483; H04L 63/1416; H04L 63/1425; H04L 61/1511; G06N 20/00;
(Continued)

(56) References Cited

U.S. PATENT DOCUMENTS 7,873,635 B2    1/2011  Wang et al.
8,515,975 B1    8/2013  Federici
(Continued)

FOREIGN PATENT DOCUMENTS

CN    108881138 A  * 11/2018  ......... H04L 63/1408
CN    111310456 A     6/2020
(Continued)

OTHER PUBLICATIONS

Jul. 22, 2020 (EP) Extended European Search Report—App. 20163522.4.
(Continued)

*Primary Examiner* — Sarah Su
(74) *Attorney, Agent, or Firm* — Banner & Witcoff, Ltd.

(57) ABSTRACT

Aspects of the disclosure relate to identifying legitimate websites and removing false positives from domain discovery analysis. Based on a list of known legitimate domains, a computing platform may generate a baseline dataset of feature vectors corresponding to the known legitimate domains. Subsequently, the computing platform may receive information identifying a first domain for analysis and may execute one or more machine learning algorithms to compare the first domain to the baseline dataset. Based on execution of the one or more machine learning algorithms, the computing platform may generate first domain classification information indicating that the first domain is a legitimate domain. In response to determining that the first domain is a legitimate domain, the computing platform may send one or more commands directing a domain identification system to remove the first domain from a list of indeterminate domains maintained by the domain identification system.

20 Claims, 19 Drawing Sheets

Related U.S. Application Data continuation of application No. 16/718,809, filed on Dec. 18, 2019, now Pat. No. 11,539,745.

(60) Provisional application No. 62/822,264, filed on Mar. 22, 2019.

(51) Int. Cl.
  *G06F 40/205* (2020.01)
  *G06N 20/00* (2019.01)
  *H04L 61/4511* (2022.01)

(52) U.S. Cl.
  CPC .......... *G06N 20/00* (2019.01); *H04L 61/4511* (2022.05); *H04L 63/1416* (2013.01); *H04L 63/1425* (2013.01)

(58) Field of Classification Search
  CPC .............. G06F 16/9577; G06F 40/205; G06F 2221/2119; G06F 21/562
  See application file for complete search history.

(56) References Cited

U.S. PATENT DOCUMENTS

| | | | |
|---|---|---|---|
| 8,943,588 | B1 | 1/2015 | Speegle et al. |
| 11,277,443 | B2 | 3/2022 | Onut et al. |
| 11,539,745 | B2 * | 12/2022 | Chang ................. H04L 63/1483 |
| 11,956,272 | B2 * | 4/2024 | Chang ................. H04L 63/1416 |
| 2010/0042931 | A1 | 2/2010 | Dixon et al. |
| 2012/0158626 | A1 | 6/2012 | Zhu et al. |
| 2014/0033307 | A1 | 1/2014 | Schmidtler |
| 2016/0065597 | A1 * | 3/2016 | Nguyen .............. H04L 63/1441 726/22 |
| 2016/0352772 | A1 * | 12/2016 | O'Connor ........... H04L 63/1483 |
| 2020/0076841 | A1 * | 3/2020 | Hajimirsadeghi .. G06F 18/2136 |
| 2020/0128038 | A1 | 4/2020 | Neystadt et al. |
| 2020/0159828 | A1 | 5/2020 | Reisswig et al. |
| 2020/0210511 | A1 | 7/2020 | Korobov et al. |
| 2020/0257717 | A1 * | 8/2020 | Li ......................... G06F 40/211 |
| 2021/0110294 | A1 | 4/2021 | Elewitz et al. |
| 2021/0182480 | A1 * | 6/2021 | Thomas ................ G06F 40/137 |

FOREIGN PATENT DOCUMENTS

| | | | | |
|---|---|---|---|---|
| CN | 116599722 | A * | 8/2023 | |
| CN | 118869292 | A * | 10/2024 | |
| EA | 3681123 | | 7/2020 | |
| EA | 3917117 | | 12/2021 | |
| EP | 2877956 | A1 | 6/2015 | |
| EP | 3713191 | A1 * | 9/2020 | ......... G06F 16/9577 |
| KR | 20220152167 | A * | 11/2022 | ............... H04L 9/40 |
| WO | 2017049042 | A1 | 3/2017 | |
| WO | WO-2021043027 | A1 * | 3/2021 | ............. G01R 31/12 |
| WO | WO-2021100902 | A1 * | 5/2021 | ......... G06F 16/3329 |
| WO | 2021169730 | A1 | 9/2021 | |
| WO | WO-2021188427 | A1 * | 9/2021 | ........... G06F 18/214 |
| WO | 2021229786 | A1 | 11/2021 | |
| WO | WO-2022203899 | A1 * | 9/2022 | ............ G06F 16/355 |

OTHER PUBLICATIONS

1st Examination report App 20163522.4.
Aug. 31, 2022 (US) Notice of Allowance—U.S. Appl. No. 16/718,809.
Mar. 23, 2022 (US) Non Final Office Action U.S. Appl. No. 16/718,809.
Jul. 6, 2023—(US) Non Final Office Action—U.S. Appl. No. 17/992,180.
Nov. 22, 2023—(EP) Decision to Grant—App. 20163522.4.
Dec. 26, 2023—(US) Notice of Allowance—U.S. Appl. No. 17/992,180.
Mar. 14, 2024—(EP) Search Report—App No. 23207982.2.

* cited by examiner

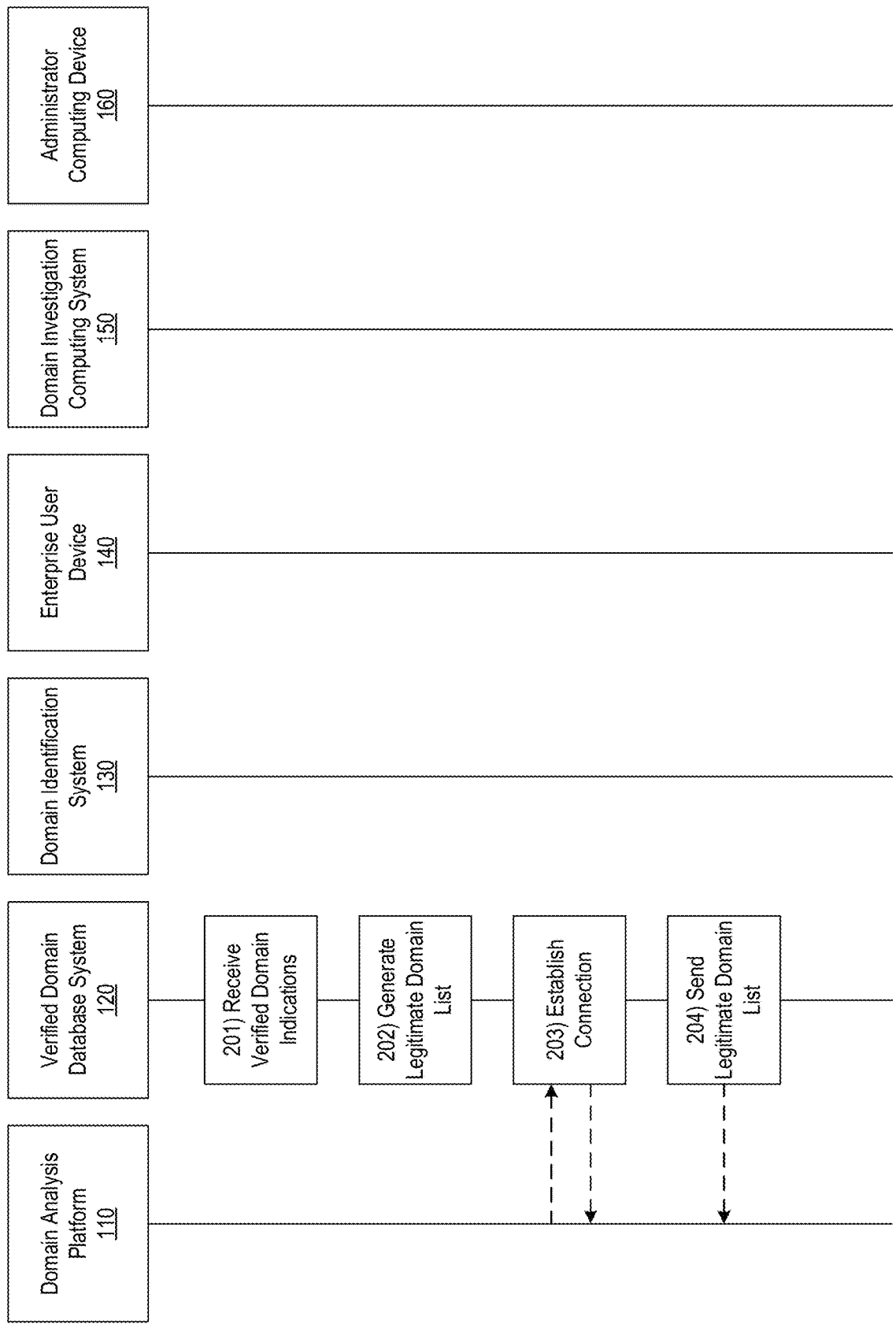

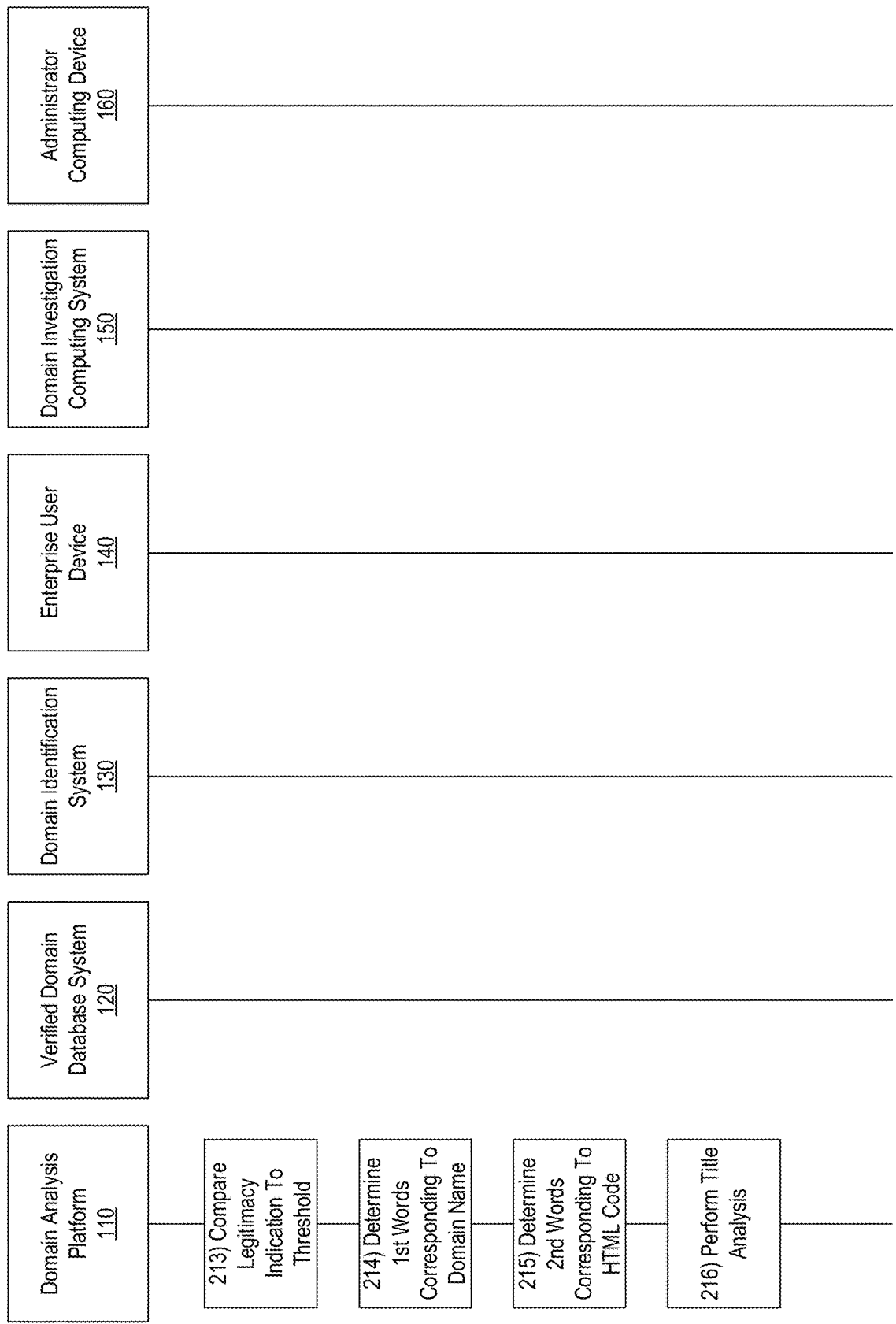

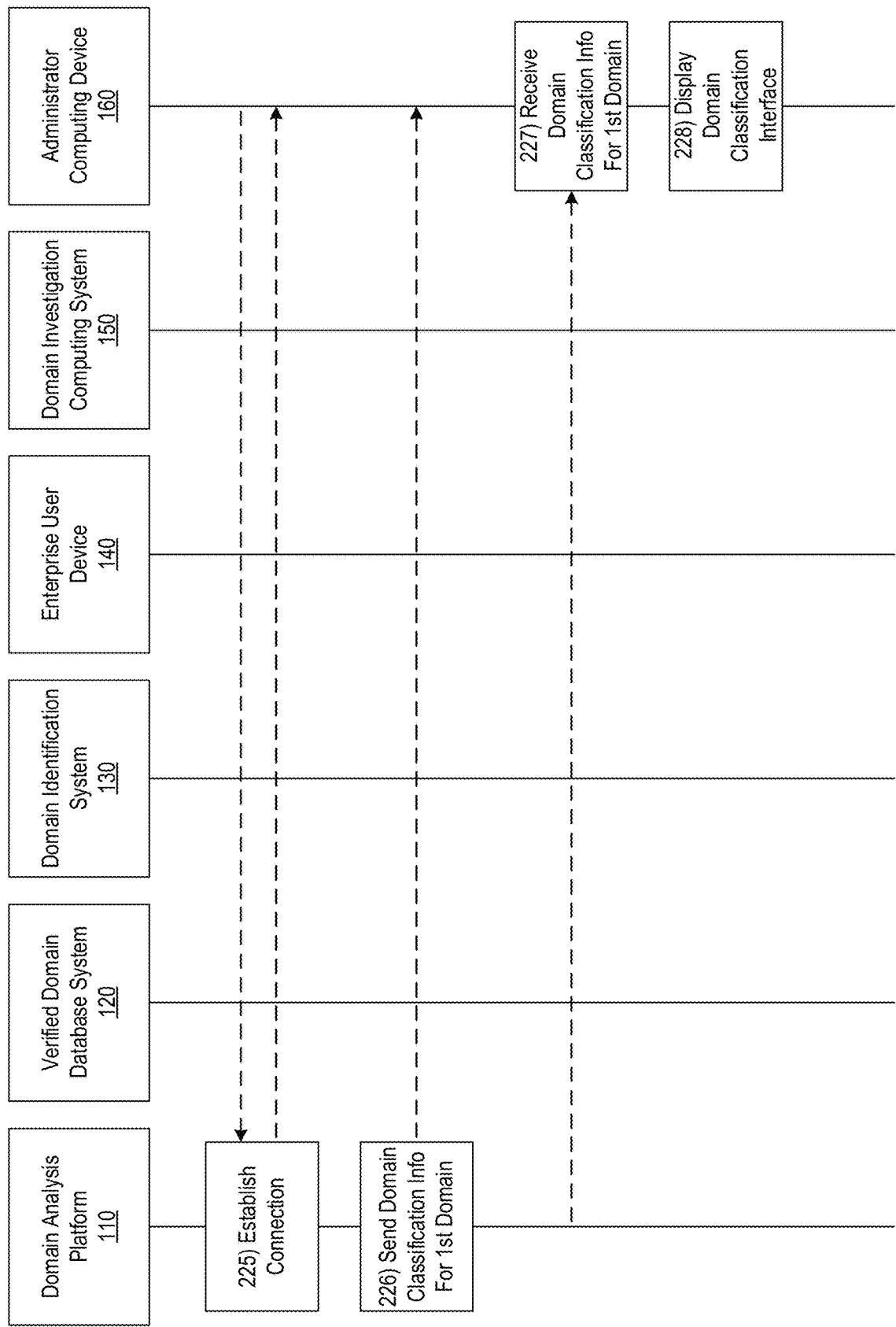

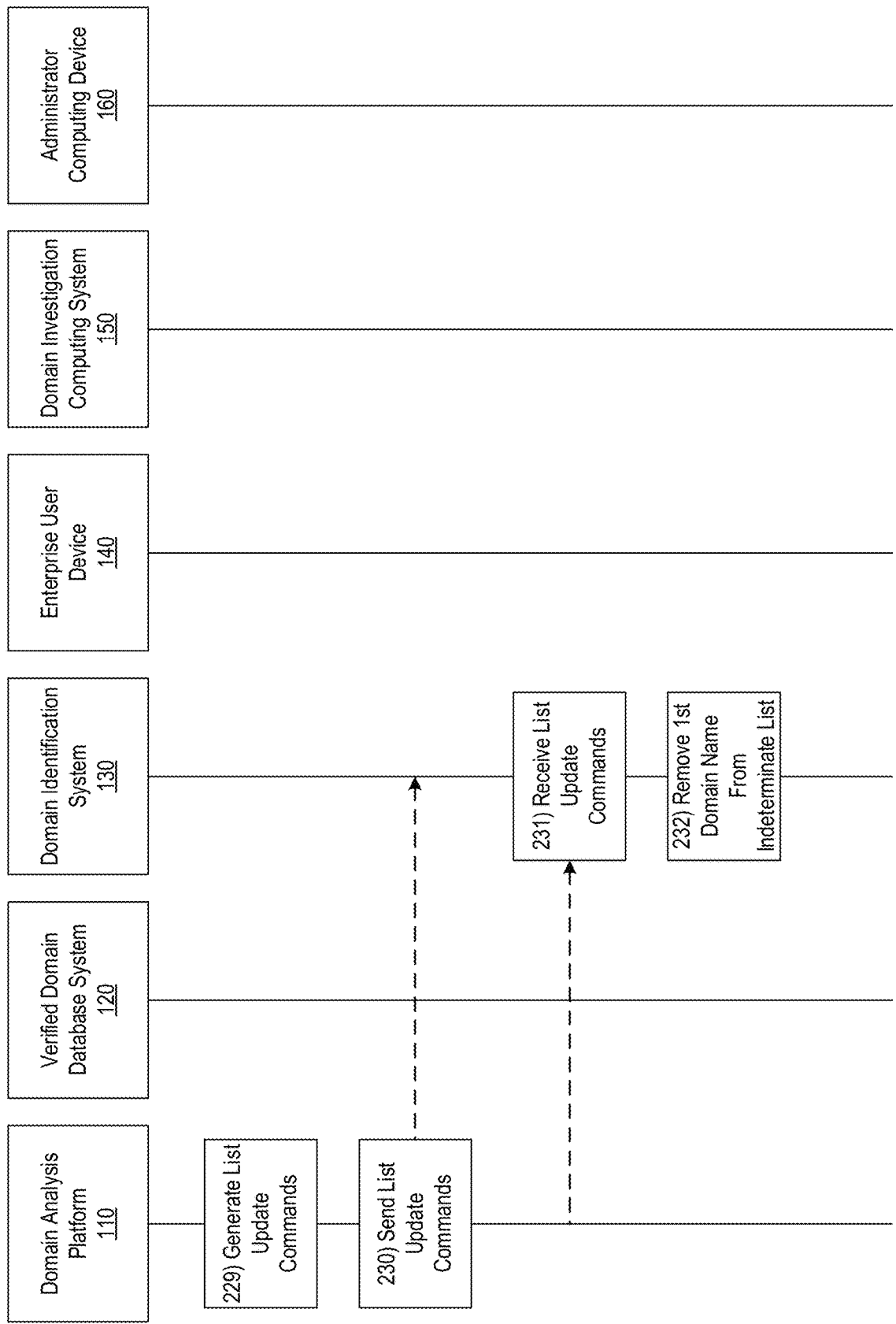

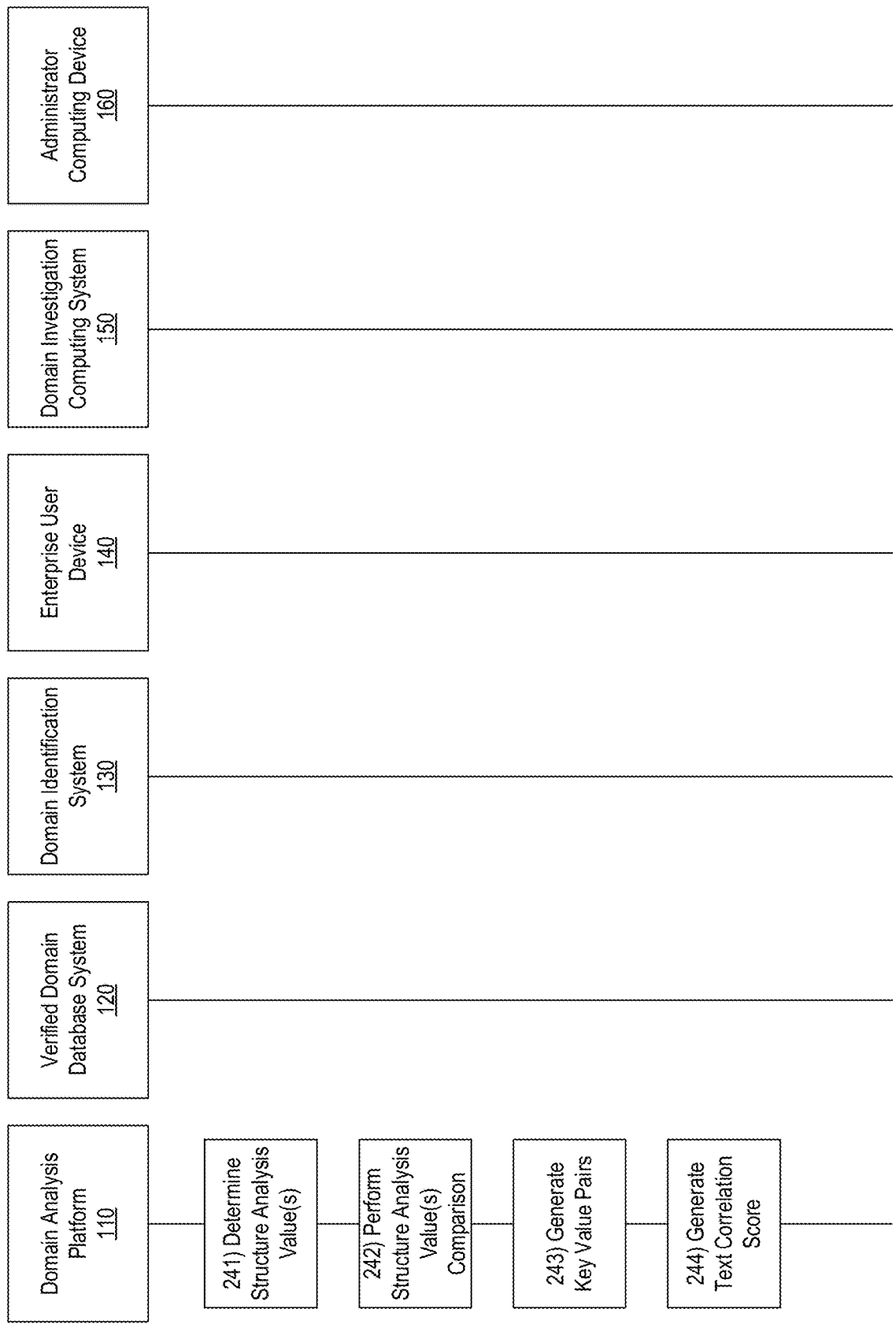

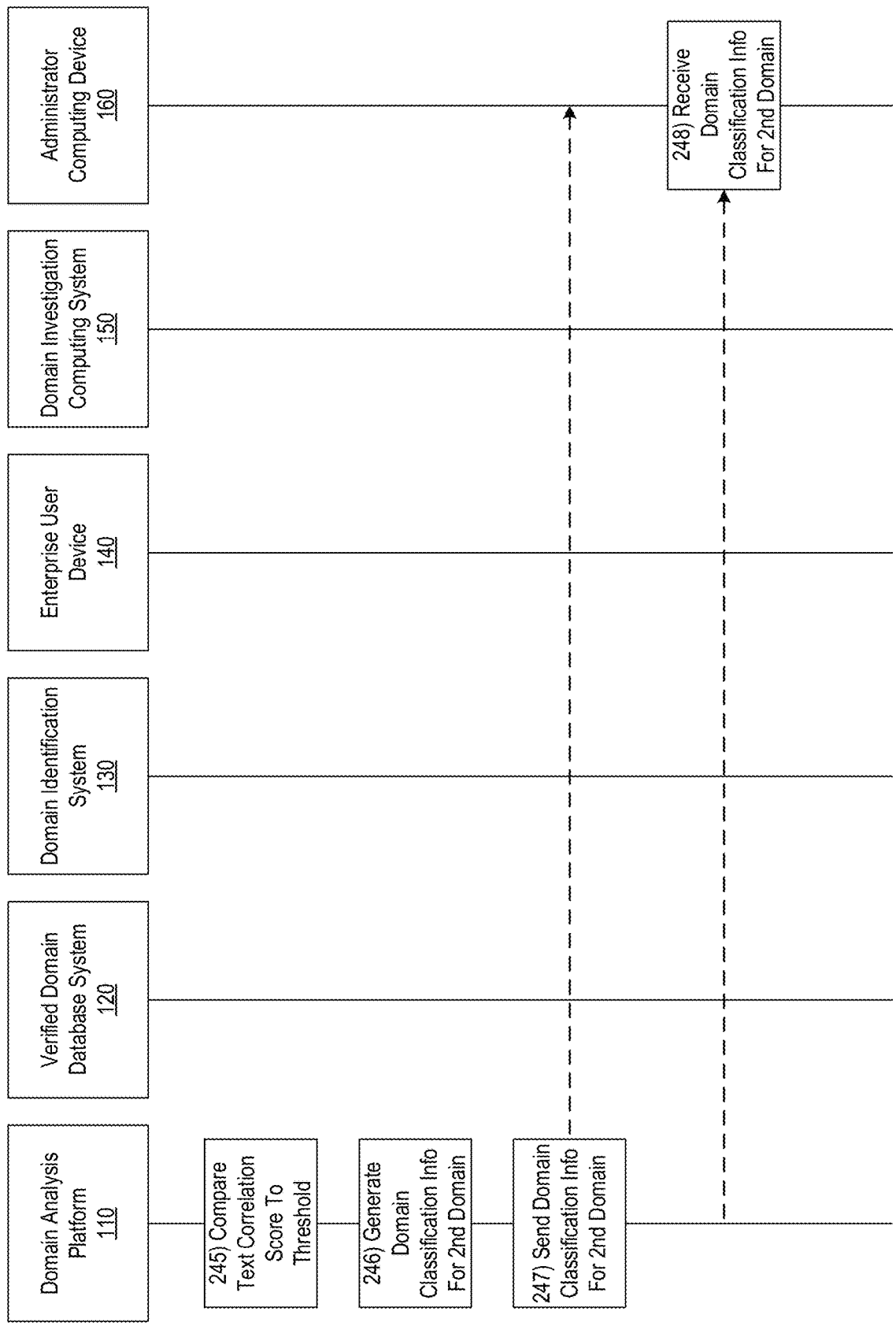

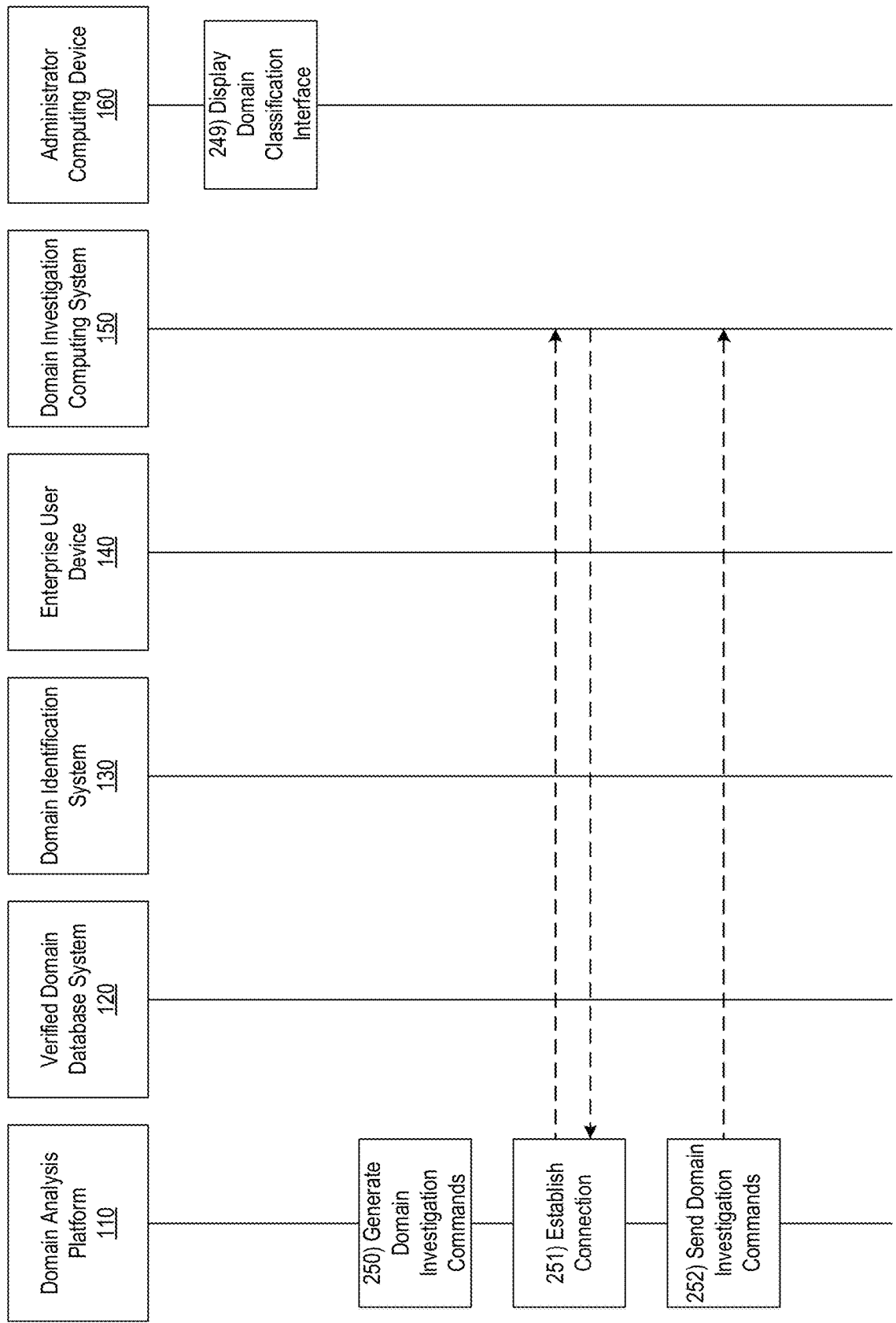

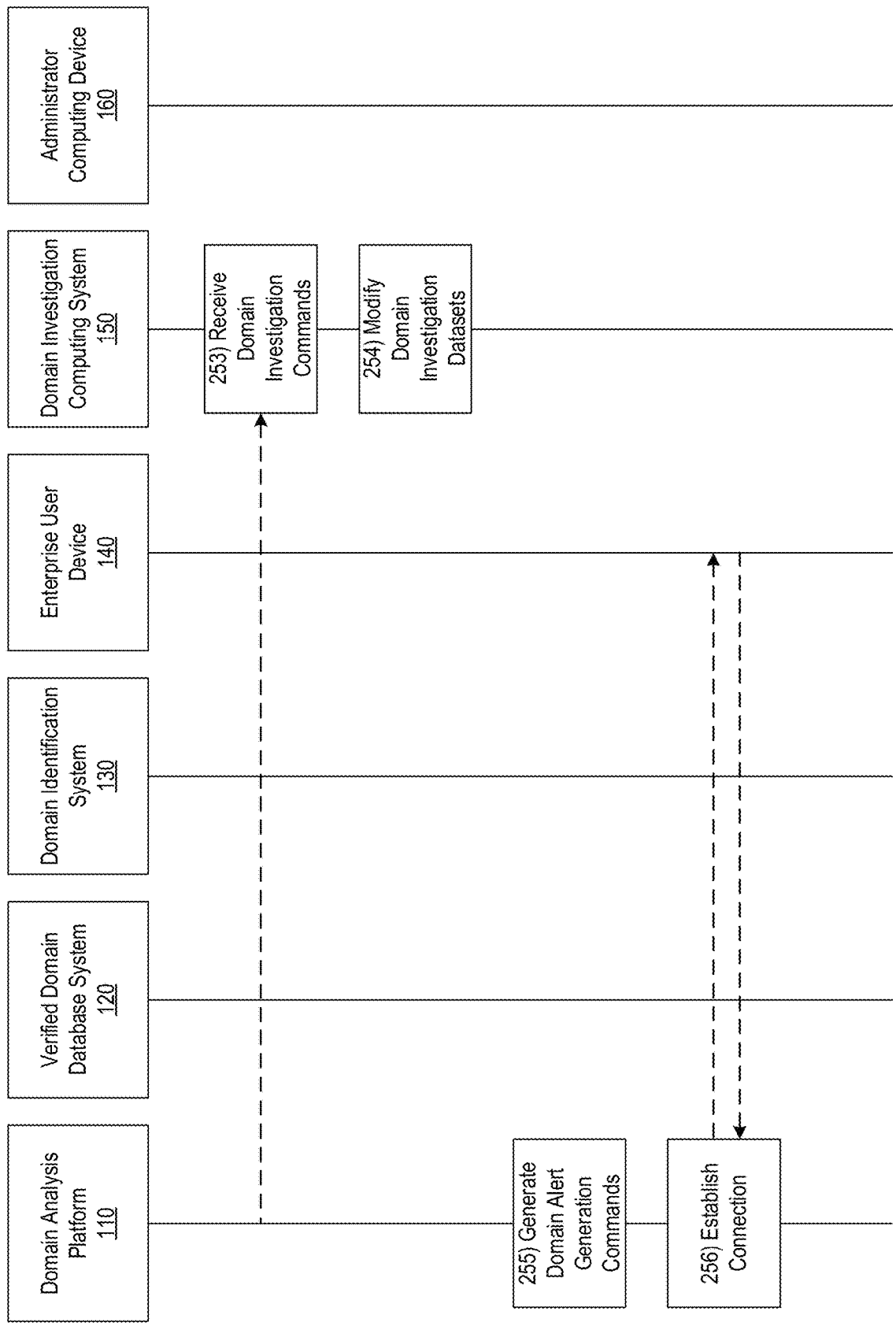

IDENTIFYING LEGITIMATE WEBSITES TO REMOVE FALSE POSITIVES FROM DOMAIN DISCOVERY ANALYSIS

CROSS-REFERENCE TO RELATED APPLICATIONS

This application is a continuation of U.S. patent application Ser. No. 17/992,180, entitled "Identifying Legitimate Websites to Remove False Positives From Domain Discovery Analysis," filed on Nov. 22, 2022, which is a continuation of U.S. patent application Ser. No. 16/718,809, entitled "Identifying Legitimate Websites to Remove False Positives From Domain Discovery Analysis," filed on Dec. 18, 2019, which claims priority to U.S. Provisional Patent Application Ser. No. 62/822,264, filed Mar. 22, 2019, and entitled "Identifying Legitimate Websites to Remove False Positives," which is incorporated by reference herein in its entirety.

TECHNICAL FIELD

Aspects of the disclosure relate to digital data processing systems, data processing methods, machine learning systems, and communication systems and networks. In particular, one or more aspects of the disclosure relate to identifying legitimate websites to remove false positives from domain discovery analysis.

BACKGROUND

Increasingly, organizations face various cybersecurity threats from malicious domains. Various methods of domain analysis have been developed to combat these threats. It remains difficult, however, to identify domains that pose an actual threat to these organizations due to an often high likelihood of false positive domain identification. This is particularly true for organizations with common word seed domains, as analysis of these common word seed domains results in a significant number of domain matches. Furthermore, it remains challenging to identify whether an organization operating a specific domain is legitimate based only on the name of the specific domain. These issues present even greater challenges when automated processes are executed to analyze large numbers of domains, particularly when also trying to balance and optimize consumption of the computing resources required for such analysis, such as processing power and network bandwidth.

SUMMARY

Aspects of the disclosure provide technical solutions that overcome one or more of the technical problems described above and/or other technical challenges. For instance, one or more aspects of the disclosure relate to identifying legitimate websites and removing false positives from domain discovery analysis.

In accordance with one or more embodiments, a computing platform having at least one processor, a communication interface, and memory may generate, based on a list of known legitimate domains, a baseline dataset comprising feature vectors (e.g., an individual vector, vector set, or the like) corresponding to the known legitimate domains. Additionally or alternatively, the computing platform may generate a baseline dataset comprising statistical measures of the feature vector sets corresponding to the known legitimate domains, statistical measures of similarity scores between the feature vector sets corresponding to the known legitimate domains, or the like. In some instances, the computing platform may generate the baseline dataset for purposes of domain classification. In these instances, the computing platform may generate a feature vector set corresponding to each domain, and in doing so may generate a single feature vector for each of a plurality of analysis modules. Subsequently, the computing platform may receive information identifying a first domain for analysis and may execute one or more machine learning algorithms, one or more statistical analysis methods, or the like to compare the first domain to the baseline dataset. For example, the computing platform may compare a feature vector set corresponding to the first domain to the baseline dataset. Based on execution of the one or more machine learning algorithms, one or more classification algorithms, or the like, the computing platform may generate first domain classification information indicating that the first domain is a legitimate domain. In response to determining that the first domain is a legitimate domain, the computing platform may send one or more commands directing a domain identification system to remove the first domain from a list of indeterminate domains maintained by the domain identification system.

In some embodiments, the computing platform may receive information identifying a second domain for analysis and may execute the one or more machine learning algorithms, one or more statistical analysis methods, or the like to compare the second domain to the baseline dataset. For example, in some instances, the computing platform may compare a feature vector set of the second domain to the baseline dataset. Based on the execution of the one or more machine learning algorithms, one or more classification algorithms, or the like, the computing platform may generate second domain classification information indicating that the second domain is an indeterminate domain. In response to determining that the second domain is an indeterminate domain, the computing platform may send one or more commands directing a domain investigation computing system to add the second domain to a list of domains for further investigation maintained by the domain investigation computing system.

In some embodiments, the computing platform may generate one or more commands directing an administrator computing device to generate, based on the second domain classification information, a domain classification interface indicating that the second domain is an indeterminate domain. Subsequently, the computing platform may send the one or more commands and the second domain classification information to the administrator computing device.

In some embodiments, executing the one or more machine learning algorithms, classification algorithms, or the like to compare the first domain to the baseline dataset may include analyzing one or more of: WHOIS registration information, Hypertext Transfer Protocol (HTTP) response size, a website template corresponding to the first domain, or a domain age corresponding to the first domain, and the analysis may result in generation of a legitimacy indication. In some instances, in doing so, the computing platform may compare critical attributes of the first domain to a statistical baseline-related dataset. In these embodiments, the computing platform may then determine that the legitimacy indication exceeds a predetermined legitimacy threshold.

In some embodiments, executing the one or more machine learning algorithms, one or more classification algorithms, or the like to compare the first domain to the baseline may include determining a first plurality of words corresponding to the first domain in response to determining that the legitimacy indication exceeds the predetermined legitimacy threshold. In some instances, in doing so, the computing platform may compare the feature vector set of the first domain to a statistical baseline related dataset. In these embodiments, the first plurality of words may include synonyms of the words (e.g., in the domain name) corresponding to the first domain. The computing platform may determine a second plurality of words including synonyms of the words in a page title of Hypertext Markup Language (HTML) source code corresponding to the first domain and may compare the first plurality of words to the second plurality of words, which may result in a synonym-based correlation indication between the first plurality of words and the second plurality of words. In some instances, the computing platform may determine the first plurality of words as categories of the words in the domain name corresponding to the first domain and the second plurality of words as categories of the words in the page title corresponding to the first domain. In these instances, the computing platform may compare the first plurality of words to the second plurality of words, which may result in a category-based correlation between the first plurality of words and the second plurality of words. Furthermore, in some instances, these individual correlations may be used to determine a title correlation indication between the domain name and page title corresponding to the first domain (which may, e.g., be a weighted average of multiple correlations such as a synonym correlation, a category correlation, or the like). Subsequently, the computing platform may determine that the title correlation indication exceeds a predetermined title correlation threshold.

In some embodiments, executing the one or more machine learning algorithms, classification algorithms, or the like to compare the first domain (e.g., a feature vector set of the first domain) to the baseline dataset (e.g., a statistical baseline dataset) may include determining feature vectors corresponding to an HTML tag structure of one or more pages associated with the first domain in response to determining that the title correlation (e.g., a page title correlation) indication exceeds the predetermined title correlation threshold. The computing platform may compare the feature vectors corresponding to the HTML tag structure to the feature vectors corresponding to the known legitimate domains, which may result in one or more structure analysis values. For example, the computing platform may determine a similarity score between the first domain and the known legitimate domains based on the HTML tag structures. The computing platform may determine that the one or more structure analysis values exceed one or more predetermined structure analysis threshold values.

In some embodiments, the one or more structure analysis values may be averages of top-N similarity scores for a plurality of selected N values. Additionally or alternatively, the one or more structure analysis values may be derived from the similarity between the feature vectors corresponding to the HTML tag structure and each of the feature vectors corresponding to HTML tag structures of the domains for modeling (e.g., the known legitimate domains). For example, a structure analysis value may be based on a weighted average of top-N similarity values (e.g., between the feature vectors corresponding to the HTML tag structure and an entirety of the feature vectors for modeling). In some instances, the structure analysis value may be a weighted average of the top-N similarity scores from a plurality of selected N values.

In some embodiments, executing the one or more machine learning algorithms, one or more classification algorithms, or the like, to compare the first domain (e.g., the feature vector set of the first domain) to the baseline dataset may include extracting text from one or more pages corresponding to the first domain in response to determining that the one or more structure analysis values exceed the one or more predetermined structure analysis threshold values. Based on the text extracted from the one or more pages corresponding to the first domain, the computing platform may determine a key value pair for each word contained in the text extracted from the one or more pages corresponding to the first domain. The computing platform may compare the key value pairs (e.g. from the first domain) to one or more of: a name of the first domain, text associated with the first domain, and social media pages linked to the first domain, which may result in generation of a text correlation score. Additionally or alternatively, the computing platform may compare, (e.g., using weighted Jaccard similarity analysis) the key value pairs to a set of key value pairs extracted from the known legitimate domains during the modeling process. Subsequently, the computing platform may determine that the text correlation score exceeds a predetermined text correlation threshold.

In some embodiments, the key value pair for each word contained in the text extracted from the one or more pages corresponding to the first domain may include a word and a weight value associated with the word, and the weight value may indicate an importance of the word to determining that the first domain is legitimate. In some embodiments, the weight value may be automatically generated by the computing platform.

In some embodiments, in response to determining that the first domain is a legitimate domain, the computing platform may send one or more commands directing a domain investigation computer system to remove the first domain from a list of domains for further investigation. In some embodiments, the first domain may be identified in response to a user request to access the first domain.

In some embodiments, the first domain may be identified based on one or more of: fuzzy matching techniques for matching of domain name seed words or identified misspelling. In some embodiments, the list of known legitimate domains may be updated to include the first domain in response to determining that the first domain comprises a legitimate domain.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
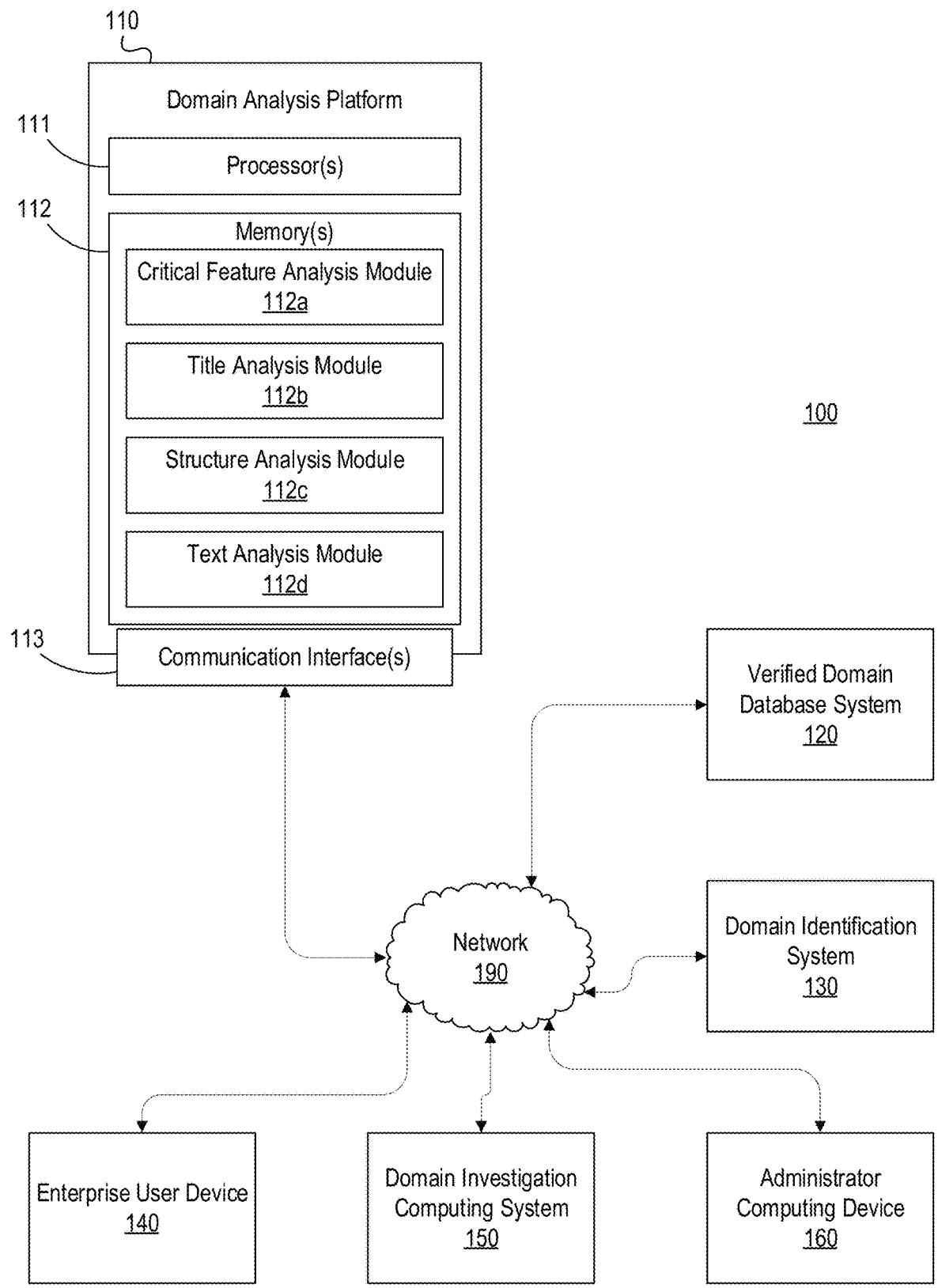
FIG. 1 depicts an illustrative operating environment for identifying legitimate websites and removing false positives from domain discovery analysis in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to identifying legitimate websites and removing false positives from domain discovery analysis. For example, in a domain discovery analysis process, variations of a specific entity's domain names may be identified and monitored so as to alert the entity (who may, e.g., be a customer of and/or subscriber to a domain discovery monitoring service) about potentially infringing domains, phishing attempts, and/or other malicious sites. In some instances, however, if the entity (e.g., the customer) has a common English word seed domain or part of a common English word in their domain name, there may be many domain matches for the entity's domain(s) during the domain discovery analysis process. Where many matches are determined for a given seed, it may become difficult for the entity (e.g., the customer) to filter down the matches to a set that includes only the domain names that are an actual threat to the entity's seed domain. To reduce a number of non-relevant results and thereby address these issues and/or other issues, one or more aspects of the disclosure provide systems and methods for identifying domain names that (1) match a specific entity's domain seed and (2) are registered by a legitimate business or other organization, so as to classify these identified domain names as false positives and remove them from a set of potentially-malicious domain names that may be subject to enhanced scrutiny.

This disclosure provides a multi-part analysis that may be employed to classify a domain (which may, in some instances, be identified as a variant of a domain name being monitored) as either legitimate or indeterminate. If a domain is classified as legitimate, this classification may indicate that the domain is owned and/or operated by a legitimate organization and has a legitimate purpose for being similar to the domain name being monitored (which may, e.g., correspond to a specific entity's domain name(s), such as a customer's domain name(s)). Alternatively, if a domain is classified as indeterminate, this classification may indicate that the domain might not be owned and/or operated by a legitimate business and/or might not have a legitimate purpose for being similar to the domain name being monitored. In these instances, further investigation of the domain, a takedown request, or other action may be initiated.

FIG. 1 depicts an illustrative operating environment for using a machine learning system and/or data mining system to identify legitimate websites and remove false positives from a domain discovery analysis in accordance with one or more example embodiments. Referring to FIG. 1, computing environment 100 may include various computer systems, computing devices, networks, and/or other operating infrastructure. For example, computing environment 100 may include a domain analysis platform 110, a verified domain database system 120, a domain identification system 130, an enterprise user device 140, a domain investigation computing system 150, an administrator computing device 160, and a network 190.

Network 190 may include one or more wired networks and/or one or more wireless networks that interconnect domain analysis platform 110, verified domain database system 120, domain identification system 130, enterprise user device 140, domain investigation computing system 150, administrator computing device 160, and/or other computer systems and/or devices. In addition, each of domain analysis platform 110, verified domain database system 120, domain identification system 130, enterprise user device 140, domain investigation computing system 150, and administrator computing device 160 may be special purpose computing devices configured to perform specific functions, as illustrated in greater detail below, and may include specific computing components such as processors, memories, communication interfaces, and/or the like.

Domain analysis platform 110 may include one or more processor(s) 111, one or more memory(s) 112, and one or more communication interface(s) 113. In some instances, domain analysis platform 110 may be made up of a plurality of different computing devices, which may be distributed within a single data center or a plurality of different data centers. In these instances, the one or more processor(s) 111, one or more memory(s) 112, and one or more communication interface(s) 113 included in domain analysis platform 110 may be part of and/or otherwise associated with the different computing devices that form domain analysis platform 110.

In one or more arrangements, processor(s) 111 may control operations of domain analysis platform 110. Memory(s) 112 may store instructions that, when executed by processor(s) 111, cause domain analysis platform 110 to perform one or more functions, as discussed below. Communication interface(s) 113 may include one or more wired and/or wireless network interfaces, and communication interface(s) 113 may connect domain analysis platform 110 to one or more networks (e.g., network 190) and/or enable domain analysis platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause domain analysis platform 110 to perform various functions) and/or databases (which may, e.g., store data used by domain analysis platform 110 in performing various functions). For example, memory(s) 112 may store and/or otherwise provide a critical feature analysis module 112a, a title analysis module 112b, a structure analysis module 112c, and a text analysis module 112d. In some instances, critical feature analysis module 112a may store instructions that cause domain analysis platform 110 to perform an initial domain analysis, determine if a domain is legitimate or indeterminate, and/or execute one or more other functions described herein. Additionally, title analysis module 112b may store instructions that cause domain analysis platform 110 to determine if words in the identified domain name are correlated with words in the title of HTML pages and/or other pages retrieved from the domain and/or execute one or more other functions described herein. Furthermore, structure analysis module 112c may store instructions that cause domain analysis platform 110 to compare an HTML tag structure of the identified domain with the structures of other known legitimate domains and/or execute one or more other functions described herein. Text analysis module 112*d* may store instructions to extract text from the identified domain, generate a correlation score (e.g., indicating a degree of relative similarity) based on the extracted text, and/or execute one or more other functions described herein.

Verified domain database system 120 may be configured to receive, store, and/or transmit data that may be used to identify a list of known legitimate domains. In some instances, the verified domain database system 120 may be integrated into the domain analysis platform 110. In other instances, the verified domain database system 120 may be separate from the domain analysis platform 110 and may communicate with the domain analysis platform 110 via a wired or wireless data connection.

Domain identification system 130 may be configured to identify domains for analysis and to transmit an indication of the identified domain to the domain analysis platform 110. The domain identification system 130 may, in some instances, identify a domain for analysis in response to determining that the domain was requested by an enterprise client device (e.g., enterprise user device 140). Additionally or alternatively, the domain identification system 130 may perform random identification of domains to verify and/or test whether they are legitimate. In one or more instances, the domain identification system 130 may be integrated into the domain analysis platform 110 and/or the verified domain database system 120. In other instances, the domain identification system 130 may be separate from the domain analysis platform 110 and may communicate with the domain analysis platform 110 via a wired or wireless data connection.

Enterprise user device 140 may be configured to be used by a user (who may, e.g., be a customer of an organization affiliated with the domain analysis platform 110). In some instances, enterprise user device 140 may be configured to present one or more user interfaces associated with a web browser, receive input composing new queries and/or domain requests, display content associated with requested queries/domains, and/or otherwise facilitate domain access.

Domain investigation computing system 150 may be configured to receive, store, and/or transmit data corresponding to a list of domains recommended for further investigation. In some instances, the domain investigation computing system 150 may be configured to add or remove domains from the list recommended for further investigation based on a domain classification indication received from the domain analysis platform 110. In one or more instances, the domain investigation computing system 150 may be integrated into the domain analysis platform 110. In other instances, the domain investigation computing system 150 may be separate from the domain analysis platform 110 and may communicate with the domain analysis platform 110 through a wired or wireless data connection.

Administrator computing device 160 may be configured to be used by an administrative user (who may, e.g., be a network administrator and/or a cybersecurity analyst associated with an enterprise organization operating domain analysis platform 110). Administrator computing device 160 may be configured to present one or more user interfaces associated with an operator dashboard, receive and/or display one or more alerts, and/or otherwise facilitate monitoring and management of one or more systems and/or devices included in computing environment 100.

Figure 2B:
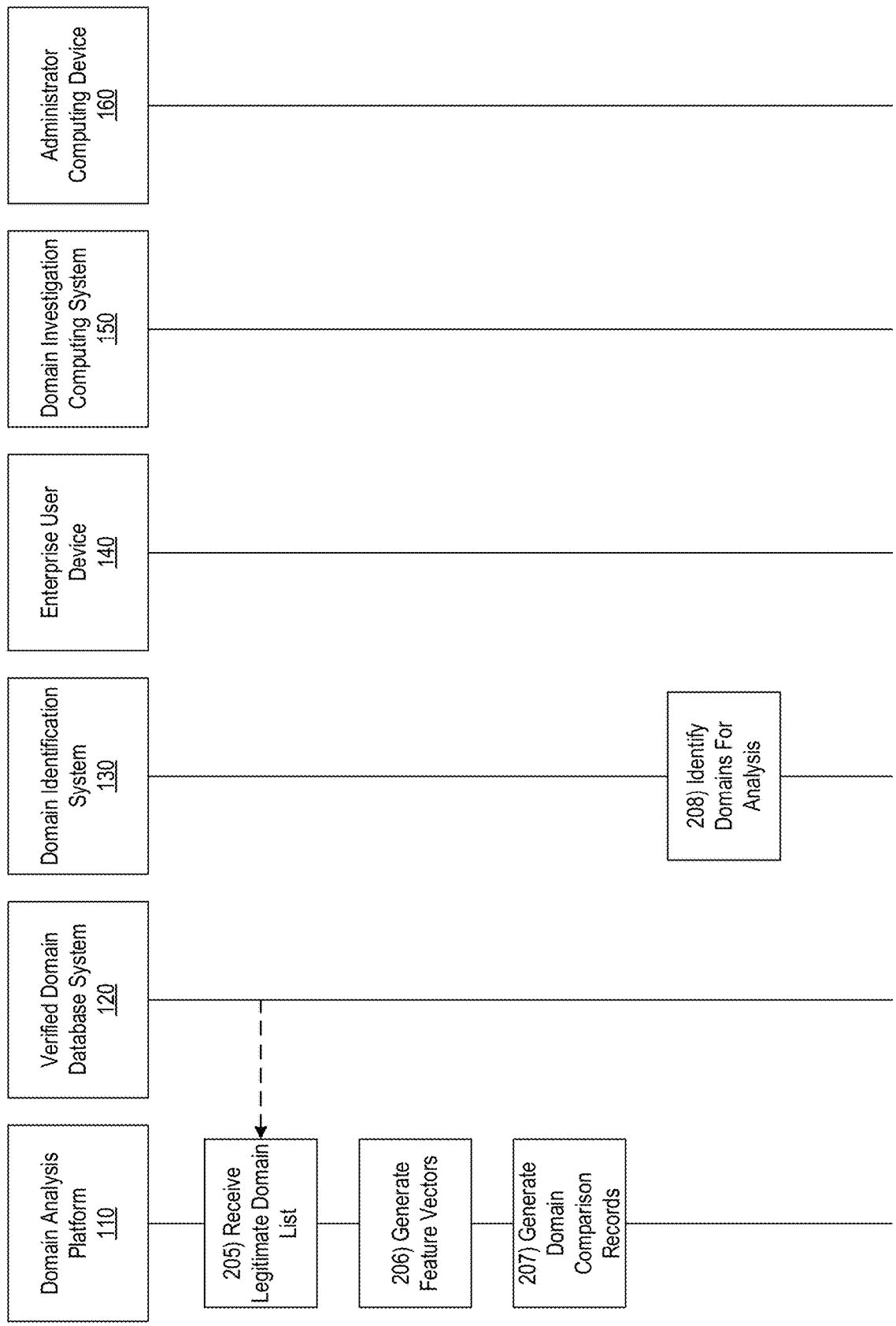
FIGS. 2A-2O depict an illustrative event sequence for identifying legitimate websites and removing false positives from domain discovery analysis in accordance with one or more example embodiments.
Figure 2C:
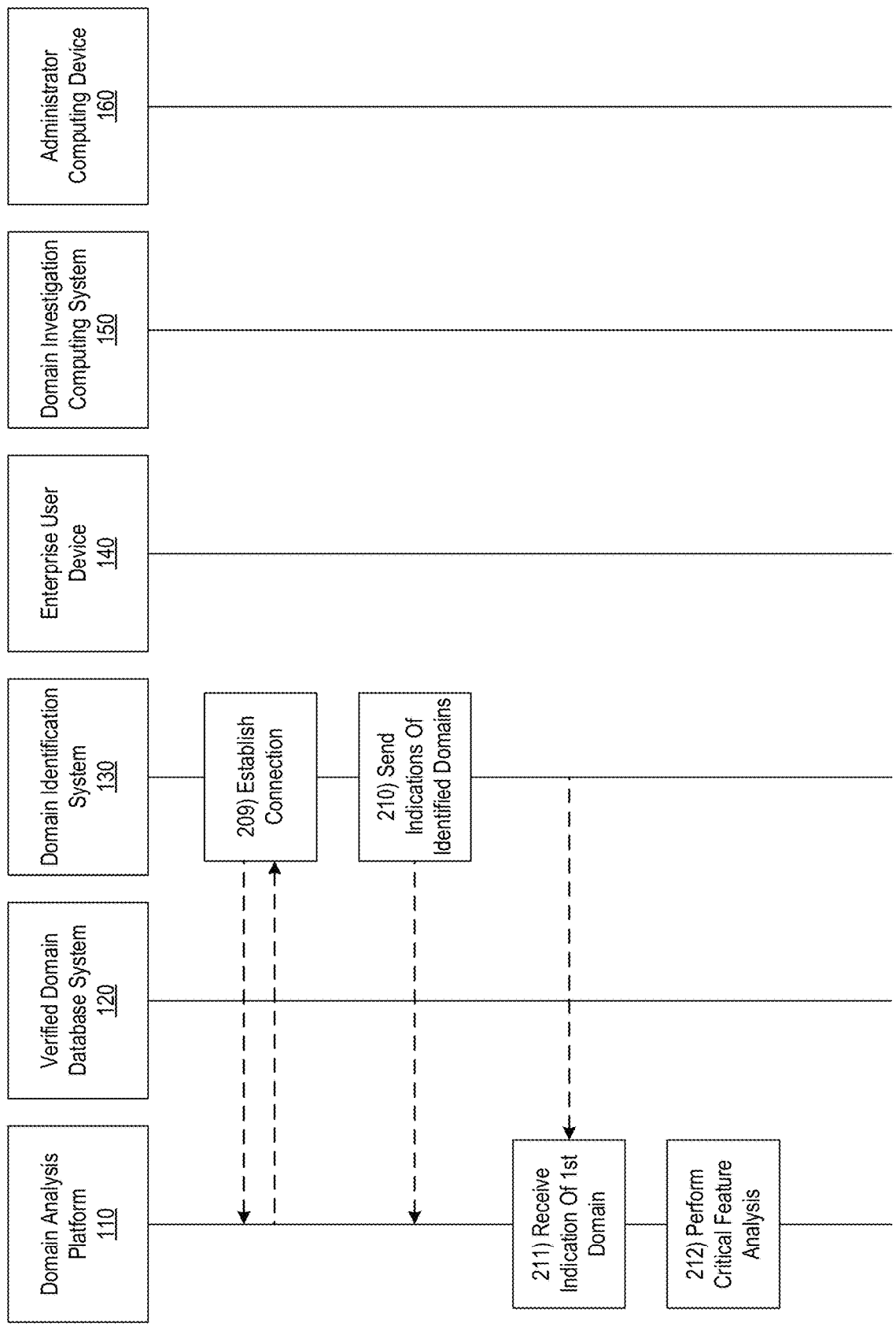
Figure 2E:
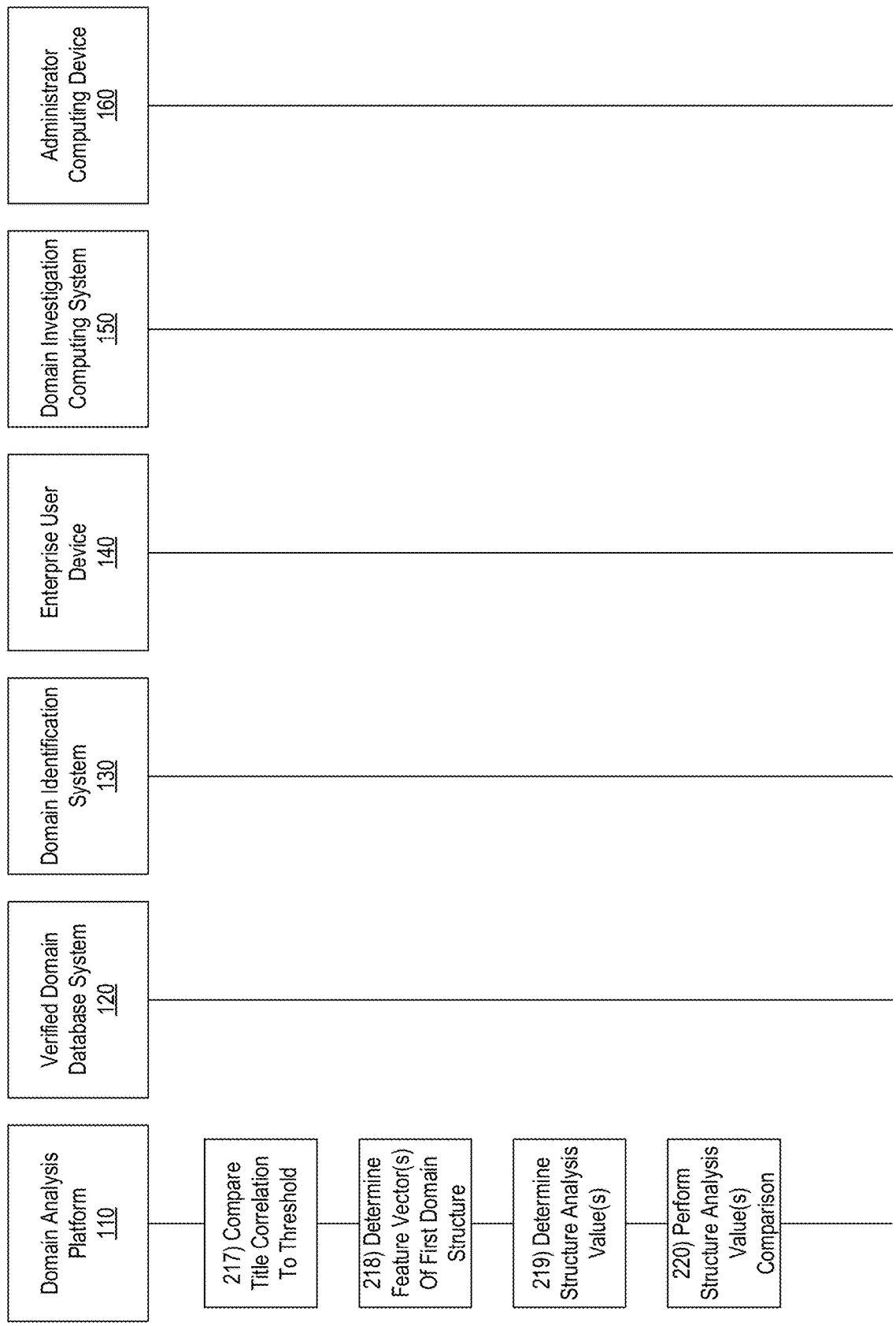
Figure 2F:
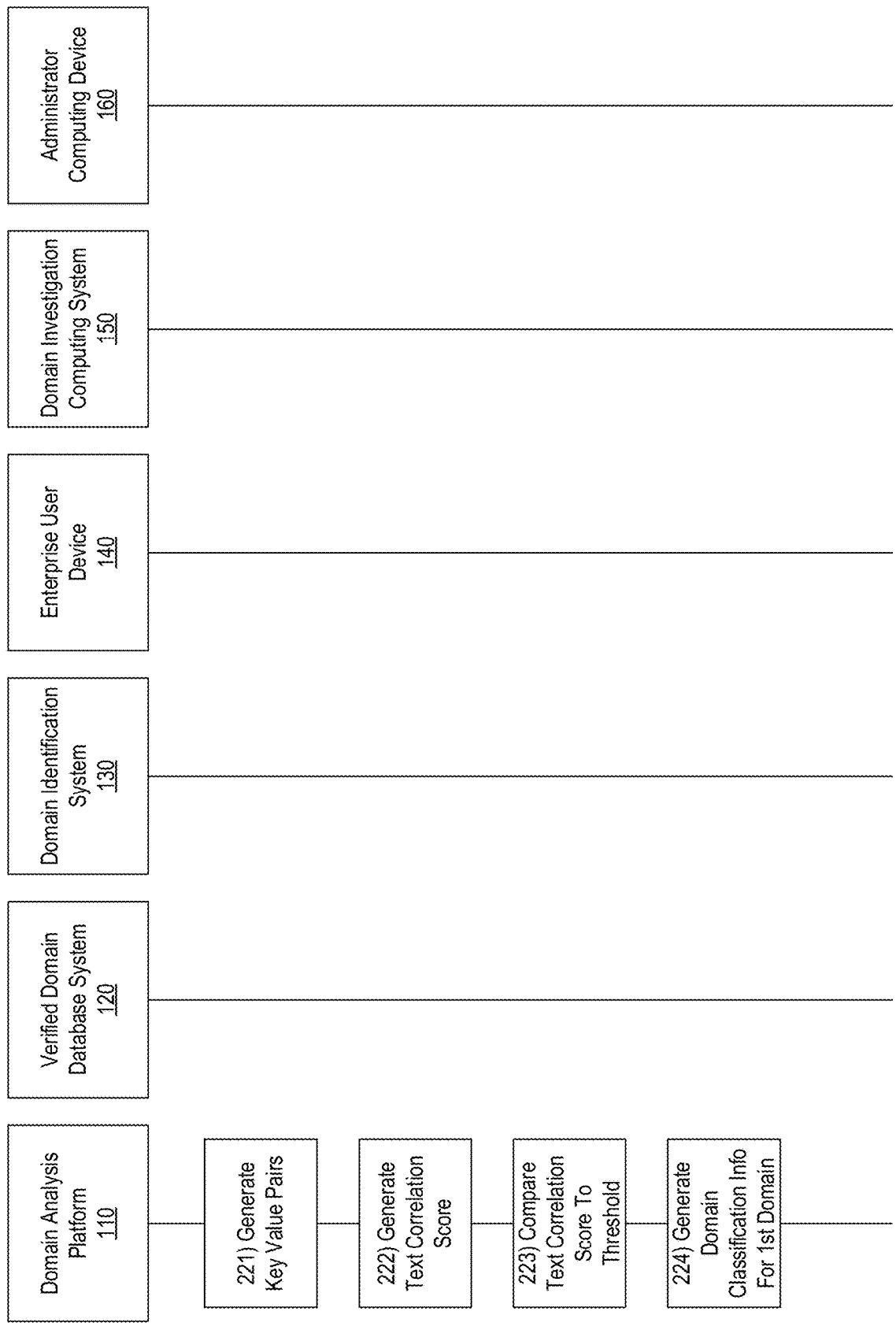
Figure 2I:
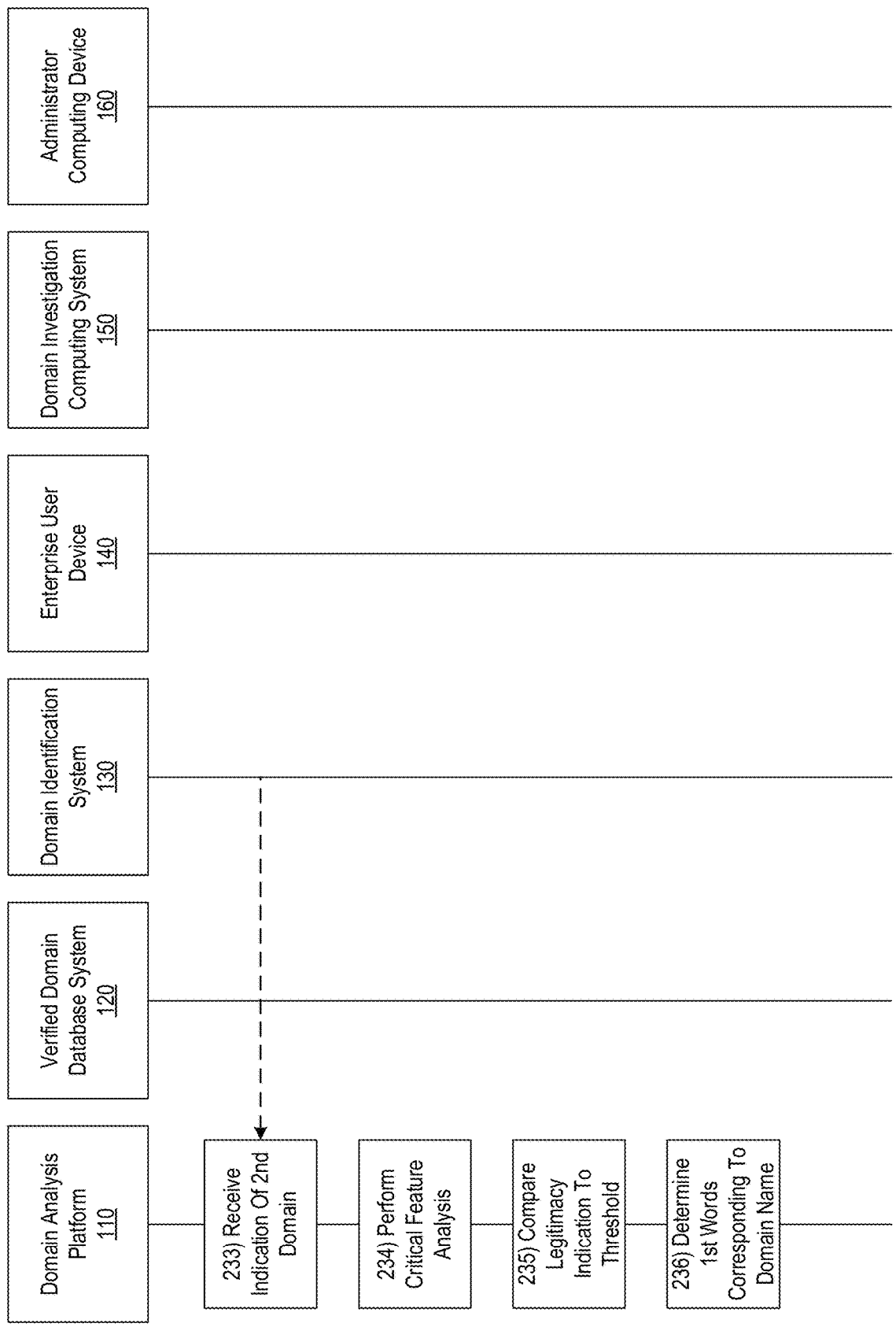
Figure 2J:
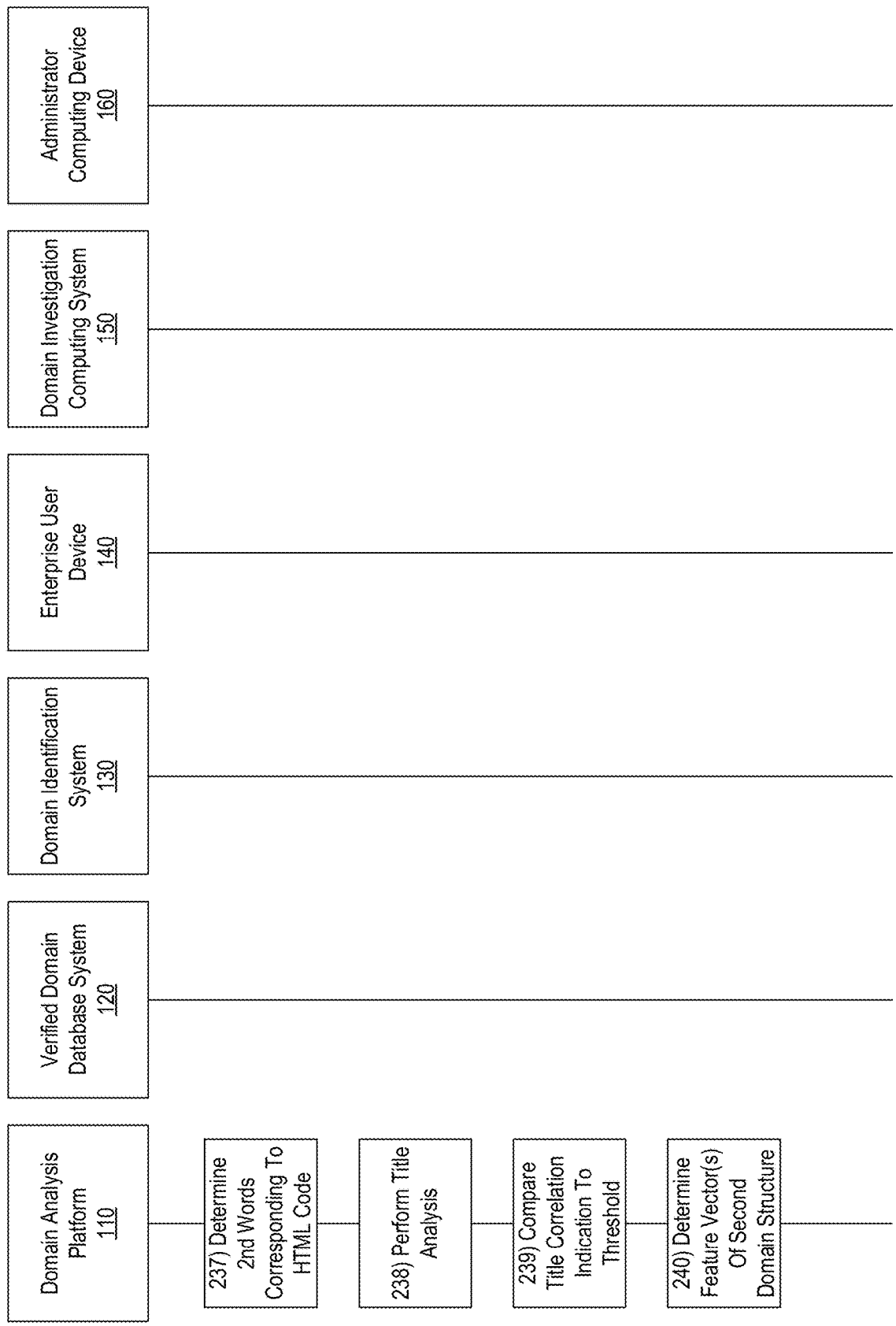
Figure 2O:
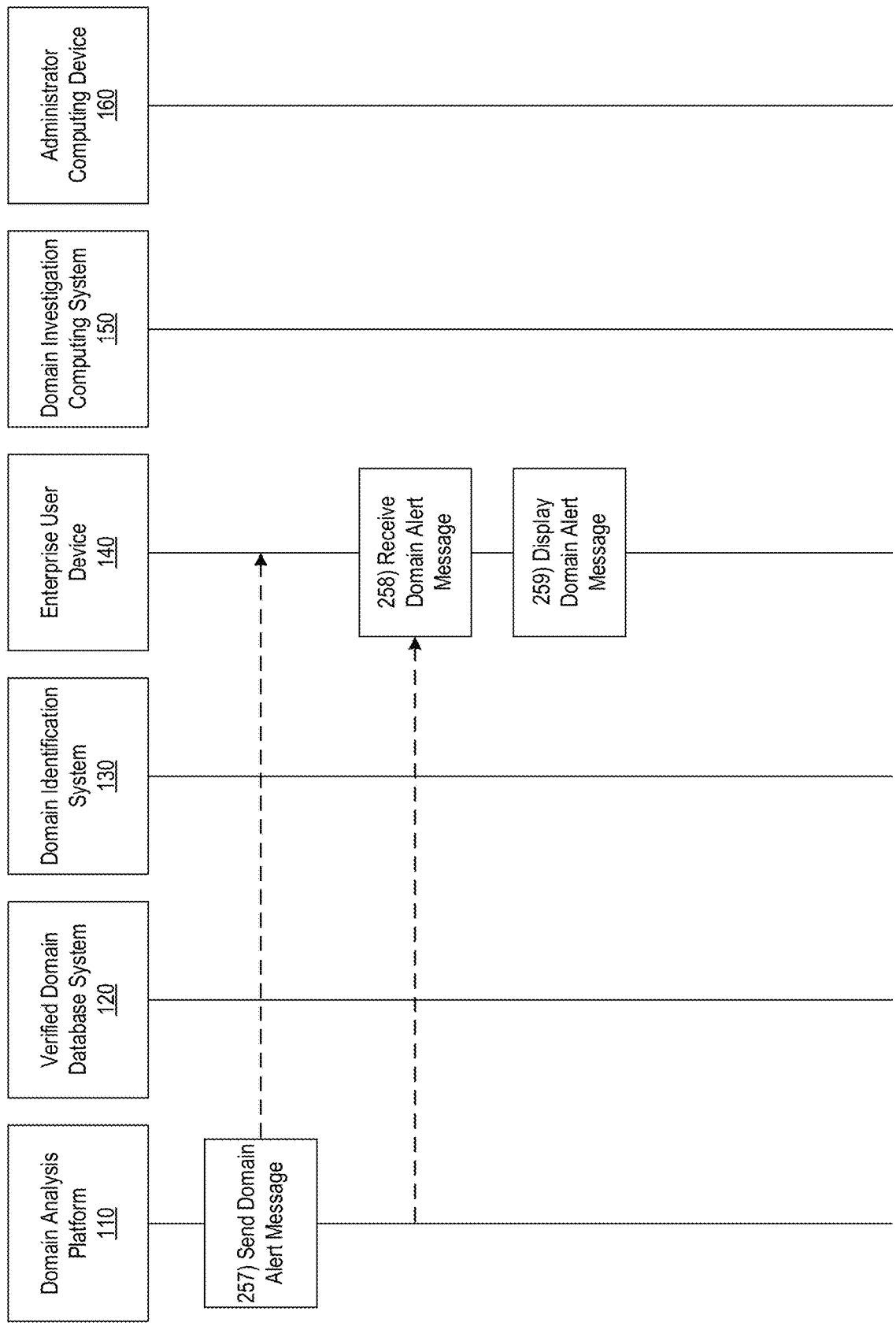

FIGS. 2A-2O depict an illustrative event sequence for identifying legitimate websites and removing false positives from a domain discovery analysis in accordance with one or more example embodiments. Referring to FIG. 2A, at step 201, verified domain database system 120 may receive one or more verified domain indications. In one or more instances, the verified domain database may receive the one or more verified domain indications by receiving a user input. In one or more other instances, the verified domain database system 120 may execute one or more machine learning and/or classification algorithms to determine the one or more verified domain indications. In these instances, the verified domain database system 120 may execute the machine learning and/or classification algorithms independently, or alternatively, another computing device (e.g., domain analysis platform 110, domain investigation computing system 150, or the like) may execute the one or more machine learning and/or classification algorithms and transmit the results of the analysis (e.g., the one or more verified domain indications) to the verified domain database system 120.

At step 202, verified domain database system 120 may generate a legitimate domain list based on the one or more verified domain indications. For example, the verified domain database system 120 may compile a list of domains corresponding to the one or more verified domain indications received at step 201. At step 203, verified domain database system 120 may establish a connection with domain analysis platform 110. For example, at step 203, verified domain database system 120 may establish a first data connection with the domain analysis platform 110 that may be used to facilitate communication between domain analysis platform 110 and verified domain database system 120 (e.g., transmission of the legitimate domain list generated at step 202).

At step 204, the verified domain database system 120 may send the legitimate domain list generated at step 202 to the domain analysis platform 110. In one or more instances, the verified domain database system 120 may send the legitimate domain list to the domain analysis platform 110 while the first data connection is established.

Referring to FIG. 2B, at step 205, domain analysis platform 110 may receive the legitimate domain list sent at step 204. In one or more instances, the domain analysis platform 110 may receive the legitimate domain list from the verified domain database system 120 via the communication interface 113 and while the first data connection is established.

At step 206, domain analysis platform 110 may generate one or more feature vectors corresponding to each of the domains included on the legitimate domain list received at step 205. In some instances, in generating the one or more feature vectors, the domain analysis platform 110 may perform critical feature analysis of the listed domains. In these instances, the domain analysis platform 110 may generate the vectors based on one or more of: WHOIS registration information, HTTP response size, a website template, a domain age, or the like associated with the domains on the legitimate domain list. In one or more instances, the domain analysis platform 110 may perform the critical feature analysis using the critical feature analysis module 112*a*. Critical feature analysis is discussed further below with regard to steps 212 and 213.

Additionally or alternatively, in generating the one or more feature vectors, the domain analysis platform 110 may perform title analysis of the listed domains (e.g., based on titles of pages of the listed domains). In these instances, the domain analysis platform 110 may use the title analysis module 112*b* to determine synonyms of words included in the listed domain names, titles of Hypertext Markup Language (HTML) source codes associated with the listed domain names, and categories of the determined words/ synonyms from domain names and titles. Title analysis is described further below with regard to steps 214-217. Additionally or alternatively, in generating the one or more feature vectors, the domain analysis platform 110 may perform a structure analysis of the listed domains. In these instances, the domain analysis platform 110 may use the structure analysis module 112c to derive information indicative of an overall structure of pages associated with the listed domains based on HTML tags. Structure analysis is described further below with regard to steps 218-220. Additionally or alternatively, in generating the one or more feature vectors, the domain analysis platform 110 may perform a text analysis of the listed domains. In these instances, the domain analysis platform 110 may use the text analysis module 112d to extract text from HTML pages associated with the listed domains. The domain analysis platform 110 may then generate tokens based on the determined text that contain both individual words and a weight associated with the individual words. For example, the domain analysis platform 110 may determine (e.g., using one or more data mining algorithms) how important each of the individual words may be to a determination that the listed domains are legitimate (e.g., "a," "the," "and," or the like might not be helpful in determining whether the domains are legitimate, but "social security number" or "credit card" may be). Text analysis is described further below with regard to steps 221-223. In some instances, the domain analysis platform 110 may perform all of the above listed methods of analysis. In other instances, the domain analysis platform 110 may perform a combination of the above listed methods of analysis that might not include all of these methods. In yet other instances, the domain analysis platform 110 may perform a single method of analysis.

At step 207, the domain analysis platform 110 may store the feature vectors, generated at step 206, as domain comparison records. In one or more instances, the domain analysis platform 110 may store the domain comparison records at a database integrated into the domain analysis platform 110. In some instances, the domain analysis platform 110 may store the domain comparison records in separate databases based on which module generated the feature vectors (e.g., a database for each of the critical feature analysis module 112a, the title analysis module 112b, structure analysis module 112c, and text analysis module 112d). In other instances, the domain analysis platform 110 may store the feature vectors in a communal database. In some instances, the domain analysis platform 110 may also store baseline-related statistical measures associated with each of the feature vectors.

At step 208, domain identification system 130 may identify domains for analysis. In one or more instances, the domain identification system 130 may identify the domains in response to receiving an indication of a request to access a particular domain. For instance, a user may initiate a request (e.g., via an enterprise user device such as enterprise user device 140) to access a particular domain and an indication of the request may be sent to the domain identification system 130. Additionally or alternatively, the domain identification system 130 may identify domains for analysis at a predetermined interval. For example, the domain identification system 130 may identify every tenth domain requested for further analysis. Additionally or alternatively, domain identification system 130 may identify domains for analysis after determining that the domain contains a misspelling. In doing so, the domain identification system 130 may compare the domain against a stored database of correctly spelled words such as a dictionary database. Additionally or alternatively, the domain identification system 130 may employ fuzzy matching techniques (e.g., Levenshtein distance algorithms, Damerau-Levenshtein distance algorithms, Bitmap algorithms, n-gram, BK-tree, Soundex, or the like) to identify domains for analysis. For example, in one or more instances, the domain identification system 130 may determine, based on results of the fuzzy matching, that a particular domain contains suspicious content and/or may be a malicious domain and should be flagged for analysis. Additionally or alternatively, the domain identification system 130 may identify domains by matching seed words in the domains. For example, the domain identification system 130 may determine that one or more domains contain seed words that match those in a target domain.

Referring to FIG. 2C, at step 209, domain identification system 130 may establish a connection with the domain analysis platform 110. For example, the domain identification system 130 may establish a second data connection with the domain analysis platform 110 to link the domain identification system 130 to the domain analysis platform 110.

At step 210, the domain identification system 130 may send, share, and/or otherwise provide indications of the domains identified at step 208. In one or more instances, the domain identification system 130 may send, share, and/or otherwise provide the indications of the identified domains while the second data connection is established. In some instances, the domain identification system 130 may send the indications of the identified domains on a real-time basis. In other instances, the domain identification system 130 may send the indications of the identified domains at predetermined intervals (e.g., once an hour) or once a predetermined number of domains have been identified (e.g., every ten identifications). In some instances, in sending the indications of the identified domains, the domain identification system 130 may send a different message for each identified domain. In other instances, the domain identification system 130 may send a single message containing a plurality of identified domains.

At step 211, the domain analysis platform 110 may receive and/or otherwise access an indication of a first identified domain sent at step 210. In one or more instances, the domain analysis platform 110 may receive the indication of the first identified domain via the communication interface 113 and while the second data connection is established.

At step 212, the domain analysis platform 110 may use the critical feature analysis module 112a to perform critical feature analysis of the first domain received. In performing the critical feature analysis of the first domain, the domain analysis platform 110 may determine feature vectors corresponding to the first domain. In one or more instances, in determining the feature vectors corresponding to the first domain, the domain analysis platform 110 may perform steps similar to those described at step 206. For example, the domain analysis platform 110 may determine WHOIS registration information, Hypertext Transfer Protocol (HTTP) response size, a website template corresponding to the first domain, domain age corresponding to the first domain, or the like and then may generate feature vectors based on this source data. In one or more instances, in performing the critical feature analysis, the domain analysis platform 110 may compare the feature vectors corresponding to the first domain with the feature vectors associated with the known legitimate domains. In these instances, the domain analysis platform 110 may compare a feature vector corresponding to the first domain with a baseline dataset comprising the feature vectors associated with the known legitimate domains and statistical measures for the critical feature analysis. In performing the comparison, the domain analysis platform 110 may determine a legitimacy indication that indicates a degree of similarity between the first domain and one or more of the known legitimate domains. In one or more instances, the legitimacy indication may be a numeric value (e.g., between one and ten). For example, the domain analysis platform 110 may determine that the first domain is associated with WHOIS registration information that is completely different from that of the known legitimate domains. In this example, the domain analysis platform 110, in determining the legitimacy indication, may determine a value of one (e.g., to indicate a high likelihood that the first domain is not a legitimate domain). In contrast, the domain analysis platform 110 may determine that the first domain has the same (e.g., within a predetermined range) HTTP response size as many of the known legitimate domains. Accordingly, the domain analysis platform 110 may determine a value of 8 or 9 for the legitimacy indication to indicate that there is a high likelihood that the first domain is a legitimate domain. In one or more instances, in determining the legitimacy indication, the domain analysis platform 110 may determine multiple numeric values (e.g., each for different data such as WHOIS registration information, HTTP response size, website template, domain age, or the like) and then may calculate a weighted average of the values and/or a cumulative score of the values to determine a final legitimacy indication.

Referring to FIG. 2D, at step 213, the domain analysis platform 110 may determine whether the legitimacy indication determined at step 212 exceeds a predetermined legitimacy threshold. In one or more instances, the predetermined legitimacy threshold may be set based on user input (e.g., received from an employee of an organization via a user interface of an administrative computing device such as administrator computing device 160). In other instances, the predetermined legitimacy threshold may be automatically determined by the domain analysis platform 110. In one or more instances, if the domain analysis platform 110 determines that the legitimacy indication does not exceed the predetermined threshold, the domain analysis platform 110 may proceed to step 224. In doing so, the domain analysis platform 110 advantageously may conserve computing resources by avoiding additional analysis of the first domain. Alternatively, if the domain analysis platform 110 determines that the legitimacy indication does not exceed the predetermined threshold, but nevertheless falls within a predetermined error range, the domain analysis platform 110 may determine that the first domain should be further analyzed to verify whether it is legitimate. In other instances, if the domain analysis platform 110 determines that the legitimacy indication does exceed the predetermined threshold, the domain analysis platform 110 may determine that the first domain may be legitimate, but may nevertheless proceed to step 214 to perform further analysis. In some instances, the predetermined threshold may be dynamic and may be periodically recomputed by the domain analysis platform 110 based on adjustments to a baseline dataset (e.g., the domain comparison records generated at step 207, or the like). It should be understood that for purposes of this illustrative event sequence it is assumed that at step 213 the domain analysis platform 110 determined that the legitimacy indication exceeds the predetermined threshold.

At step 214, the domain analysis platform 110 may initiate a title analysis process (e.g., of a page title) using the title analysis module 112b. For example, the domain analysis platform 110 may determine a first plurality of words corresponding to a title and/or name of the first domain (e.g., in the title of the first domain). For instance, the domain analysis platform 110 may identify specific words that are included in the title and/or name of the first domain using one or more regular expressions and/or other algorithms to isolate and identify such words. In these instances, in determining the first plurality of words, the domain analysis platform 110 may also determine synonyms of words in the first domain. In one or more instances, the domain analysis platform 110 may also determine one or more categories that are derived from the first plurality of words and/or otherwise associated with the first plurality of words.

At step 215, the domain analysis platform 110 may determine a second plurality of words that correspond to an HTML page of the first domain (e.g., corresponding to the page title of an HTML source code for the first domain). For example, the domain analysis platform 110 may scan and identify specific words that are included in one or more HTML pages that are hosted on and/or otherwise associated with the first domain, using one or more regular expressions and/or other algorithms to isolate and identify such words. As illustrated below, this identification process may enable the domain analysis platform 110 to determine whether and/or to what degree words in the name of the domain correspond to words in the title of the page(s) hosted on the domain, as a relatively closer correlation between such words may be indicative of the domain being legitimate (and/or a relatively farther correlation between such words may be indicative of the domain being indeterminate or illegitimate). In one or more instances, in determining the second plurality of words, the domain analysis platform 110 may determine synonyms of the words that correspond to the HTML page of the first domain (e.g., to a page title of HTML source code for the first domain). In one or more instances, the domain analysis platform 110 may also determine one or more categories that are derived from the second plurality of words and/or otherwise associated with the second plurality of words.

At step 216, the domain analysis platform 110 may compare the first plurality of words to the second plurality of words to determine a title correlation indication for the first domain. In doing so, the domain analysis platform may determine whether content of the HTML page (e.g., a page title in the HTML source code) appears to be related to the title of the first domain, which may enable the domain analysis platform 110 to predict whether the first domain is legitimate or not. Additionally or alternatively, the domain analysis platform 110 may compare the categories derived from both the first and second pluralities of words. For example, the domain analysis platform 110 may determine that the first plurality of words includes words relating to a "dental/insurance" category and the second plurality of words includes words relating to a "health/medical" category. In this example, the domain analysis platform 110 may determine that the categories derived from both the first and second plurality of words match, based on a similarity between 'dental/insurance' words and 'health/medical' words. The domain analysis platform 110 may then calculate and/or otherwise determine a numeric value indicative of the correlation between the content of the title and the HTML page of the first domain (e.g., between the page title of the HTML page and the domain name of the first domain). For example, the domain analysis platform 110 may determine that the second plurality of words contains all of the first plurality of words and that synonyms and/or the categories derived from the first and second pluralities of words all match. In this example, the domain analysis platform 110 may determine that the first domain is likely legitimate, and may calculate and/or otherwise generate a title correlation indication indicative of this determination (e.g., the title correlation indication in this example may be calculated to be 10/10). In another example, the domain analysis platform 110 may determine that the second plurality of words does not contain any of the first plurality of words and that the synonyms and/or categories derived from the first and second pluralities of words do not match. In this example, the domain analysis platform 110 may determine that the first domain is likely indeterminate and may calculate and/or otherwise generate a title correlation indication indicative of this determination (e.g., the title correlation indication in this example may be calculated to be 1/10). In some instances, at step 216, the domain analysis platform 110 may perform a comparison of synonyms of the first plurality of words and synonyms of the second plurality of words.

Referring to FIG. 2E, at step 217, domain analysis platform 110 may compare the title correlation indication determined at step 216 to a predetermined title correlation threshold. In one or more instances, the predetermined title correlation threshold may be determined based on user input (e.g., input from an employee of an organization affiliated with the domain analysis platform 110). In other instances, the predetermined title correlation threshold may be automatically generated by the domain analysis platform 110 (in some instances, this may occur at step 207). In one or more instances, if the domain analysis platform 110 determines that the title correlation indication does not exceed the predetermined correlation threshold, the domain analysis platform 110 may proceed to step 224. In doing so, the domain analysis platform 110 advantageously may conserve computing resources by avoiding additional analysis of the first domain. Alternatively, if the domain analysis platform 110 determines that the title correlation indication does not exceed the predetermined correlation threshold, but nevertheless falls within a predetermined error range, the domain analysis platform 110 may determine that the first domain should be further analyzed to verify whether it is legitimate. In other instances, if the domain analysis platform 110 determines that the title correlation indication does exceed the predetermined correlation threshold, the domain analysis platform 110 may determine that the first domain may be legitimate, but may nevertheless proceed to step 217 to perform further analysis. In some instances, the predetermined title correlation threshold may be dynamic and may be periodically recomputed by the domain analysis platform 110 based on adjustments to a baseline dataset (e.g., the domain comparison records generated at step 207, or the like). It should be understood that for purposes of this illustrative event sequence it is assumed that at step 217 the domain analysis platform 110 determined that the title correlation indication exceeded the predetermined title correlation threshold.

At step 218, the domain analysis platform 110 may use the structure analysis module 112c to initiate a structure analysis process. In these instances, the domain analysis platform 110 may determine one or more feature vectors corresponding to an HTML tag structure of pages associated with the first domain (e.g., based on a statistical baseline-related dataset such as the feature vectors stored at step 207). In determining the feature vectors corresponding to the first domain, the domain analysis platform 110 may determine an order, number, or the like of different types of tags in the pages associated with the first domain. The domain analysis platform 110 then may generate the feature vectors by creating one or more datasets comprising information identifying the order, number, or the like of different types of tags in the pages associated with the first domain. Such tags may include various HTML tags, such as header tags, body tags, anchor tags, image tags, division tags, or the like.

At step 219, the domain analysis platform 110 may compare the feature vectors corresponding to the first domain with the feature vectors of the domain comparison records generated at step 207. In comparing these feature vectors, the domain analysis platform 110 may compute one or more structure analysis values (e.g., indicative of statistical similarity between feature vectors) such as average, top-N, maximum similarity, or the like. For instance, the domain analysis platform 110 may compute and compare an average number of each type of tag included in the structures, a top-N value (e.g., a smallest or largest value) associated with each type of tag included in the structures and/or various feature vectors, a maximum similarity (e.g., a numerical score indicative of the degree of correlation between the feature vectors corresponding to the first domain and the feature vectors of the domain comparison records) associated with each type of tag, or the like. Additionally or alternatively, the domain analysis platform 110 may compute cosine similarities between the feature vector associated with the first domain and each of the feature vectors of the domain comparison records prepared at step 207. In these instances, the domain analysis platform 110 may use a maximum similarity, an average similarity, a top_N average similarity, or the like to calculate a numerical score indicative of the degree of similarity between the feature vector corresponding to the first domain and the feature vectors of the domain comparison records.

At step 220, the domain analysis platform 110 may compare the one or more structure analysis values (e.g., indicative of statistical similarity between feature vectors) to predetermined structure analysis threshold values. In one or more instances, the predetermined structure analysis threshold values may be determined based on user input (e.g., input from an employee of an organization affiliated with the domain analysis platform 110). In other instances, the predetermined structure analysis threshold values may be automatically generated by the domain analysis platform 110 (e.g., at step 207). In one or more instances, if the domain analysis platform 110 determines that the structure analysis values associated with the first domain do not exceed the predetermined structure analysis threshold values, the domain analysis platform 110 may proceed to step 224. In doing so, the domain analysis platform 110 may conserve computing resources by avoiding additional analysis of the first domain. Alternatively, if the domain analysis platform 110 determines that the structure analysis values associated with the first domain do not exceed the predetermined structure analysis threshold values, but nevertheless fall within a predetermined error range, the domain analysis platform 110 may determine that the first domain should be further analyzed to verify whether it is legitimate. In other instances, if the domain analysis platform 110 determines that the structure analysis values associated with the first domain do exceed the predetermined structure analysis threshold values, the domain analysis platform 110 may determine that the first domain may be legitimate, but may nevertheless proceed to step 221 to perform further analysis. In some instances, the predetermined structure analysis threshold values may be dynamic and may be periodically recomputed by the domain analysis platform 110 based on adjustments to a baseline dataset (e.g., the domain comparison records generated at step 207, or the like). It should be understood that for purposes of this illustrative event sequence it is assumed that at step 220 the domain analysis platform 110 determined that the structure analysis values exceeded the predetermined structure analysis threshold values.

Referring to FIG. 2F, at step 221, the domain analysis platform 110 may use the text analysis module 112*d* to initiate text analysis of the first domain. In one or more instances, the domain analysis platform 110 may generate key value pairs based on words extracted from text of HTML pages of the domain. For example, in generating the key value pairs, the domain analysis platform 110 may generate a word-weight pair for each word extracted from content pages associated with the first domain. In these instances, the domain analysis platform 110 may determine the weight for each of the keys based on how relevant the particular word is to a determination of whether the domain is legitimate. For example, words such as "a," "the," "and," or the like might not be relevant to whether the first domain is legitimate, and thus the domain analysis platform 110 may assign a weight value to such keys accordingly (e.g., 1/10). However, words such as "social security number," "account number," "credit card," or the like may be relevant to whether the first domain is legitimate, and thus the domain analysis platform 110 may assign a weight value to such keys accordingly (e.g., 9/10). In one or more instances, the domain analysis platform 110 may maintain one or more templates identifying one or more sets of specific words as being relevant and/or one or more sets of specific words as being not relevant, as well as predefined values defining weight values for various words in the different sets of words. In addition, the domain analysis platform 110 may maintain a database of the key value pairs. In these instances, the domain analysis platform 110 may index an extracted word from the first domain and may perform a lookup function in the key value pair database to determine the corresponding weight value. In some instances, the weight values may be determined based on a user input (e.g., set by an employee of an organization affiliated with the domain analysis platform 110). In other instances, the weight values may be determined and refined using one or more machine learning algorithms and datasets to determine have valuable various words are to a determination of whether or not a domain is legitimate. In some instances, the weight values may be determined and refined using one or more data mining algorithms (e.g., term frequency-inverse document frequency (TF-IDF) weighting scheme, or the like). In some instances, keys having a high weight value may be selected by the domain analysis platform 110 for use in formation of a key value pair.

At step 222, the domain analysis platform 110 may compare the key value pairs to the first domain name, social media pages associated with the first domain, other text associated with the first domain, or the like with the first domain name to determine a text correlation score (e.g., indicating a degree of similarity between the first domain name and the other text). For example, the domain analysis platform 110 may compare the words in the key value pairs (e.g., significant segment words) from the first domain name to key value pairs for social media pages associated with the first domain, other text associated with the first domain, or the like to determine whether the first domain name, the social media pages associated with the first domain, the other text associated with the first domain, or the like. In some instances, the domain analysis platform 110 may determine that the words from the first domain name match key token sets from the social media pages associated with the first domain, and/or the other text associated with the first domain. In some instances, the domain analysis platform 110 may also compare the key value pairs associated with the first domain to other previously extracted key value pairs (which may, e.g., have been extracted at 207 and associated with the known legitimate domains). In these instances, the domain analysis platform 110 may generate a text correlation score (indicating a degree of similarity) to indicate that the first domain is likely legitimate (e.g., 9/10).

In other instances, the domain analysis platform 110 may determine that some words from the key value pairs match the other text while other words from the key value pairs do not match the other text. In these instances, the domain analysis platform 110 may look to the weight values of the matching words. For example, if the matching words are associated in their key value pairs with a weight value indicating that they are important to the determination of whether the first domain is legitimate, the domain analysis platform 110 may generate a text correlation score to indicate that the first domain is likely legitimate (e.g., 9/10). However, if the domain analysis platform 110 determines that the matching words are associated in their key value pairs with weight values indicating that they are not important to the determination of whether the first domain is legitimate, the domain analysis platform 110 may generate a text correlation score to indicate that the first domain is likely indeterminate (e.g., 2/10). Similarly, if the domain analysis platform 110 determines that the words from the key value pairs do not match the other text, the domain analysis platform may generate a text correlation score to indicate that the first domain is likely indeterminate (e.g., 2/10).

At step 223, the domain analysis platform 110 may compare the text correlation score to a predetermined text correlation threshold. In one or more instances, the predetermined text correlation threshold may be determined based on user input (e.g., input from an employee of an organization affiliated with the domain analysis platform 110). In other instances, the text correlation threshold may be automatically generated by the domain analysis platform 110 (e.g., in some instances, at step 207). In one or more instances, the domain analysis platform 110 may determine that the text correlation score associated with the first domain does not exceed the predetermined text correlation threshold. In some instances, if the domain analysis platform 110 determines that the text correlation score associated with the first domain does not exceed the predetermined text correlation threshold, but nevertheless falls within a predetermined error range, the domain analysis platform 110 may determine that the first domain should be further analyzed to verify whether it is legitimate. In yet other instances, if the domain analysis platform 110 determines that the text correlation score associated with the first domain does exceed the predetermined text correlation threshold, the domain analysis platform 110 may determine that the first domain may be legitimate. In some instances, the predetermined text correlation threshold may be dynamic and may be periodically recomputed by the domain analysis platform 110 based on adjustments to a baseline dataset (e.g., the domain comparison records generated at step 207, or the like). It should be understood that for purposes of this illustrative event sequence it is assumed that at step 223 the domain analysis platform 110 determined that the text correlation score exceeded the predetermined text correlation threshold.

At step 224, the domain analysis platform 110 may, in response to determining that the first domain passed each of the predetermined thresholds described above, generate domain classification information indicating that the first domain is legitimate. For example, at step 224, the domain analysis platform 110 may determine that the first domain is legitimate because the domain analysis platform 110 did not flag the first domain as indeterminate during the critical feature analysis process, title analysis process, structure analysis process, and/or text analysis process (i.e., because the first domain cleared the predetermined thresholds associated with each portion of the domain analysis). In some instances, the domain analysis platform 110 may also generate one or more commands directing the administrator computing device 160 to cause display of a domain classification interface based on the domain classification information. It should also be understood that this event sequence is merely illustrative, and that any combination of the above listed analysis processes (e.g., critical feature analysis, title analysis, structure analysis, and text analysis) may be performed in any order or combination and the methods described herein should not be limited by the illustrative order/combination described with regard to this event sequence. For example, in some instances, these analysis processes may occur in parallel rather than sequentially. Furthermore, although it is described that the domain analysis platform 110 compares various data to predetermined values and thresholds throughout the example analysis processes described herein, it should be understood that the domain analysis platform 110 may determine the various data for each aspect of the analyses, generate an overall score, and compare the overall score to one overarching threshold value as opposed to the various different thresholds described herein. In these instances, the domain analysis platform 110 may weigh the results of the critical feature, structure, text, and title analysis differently. For example, the domain analysis platform may weigh the title analysis process more heavily than the structure analysis process, critical feature analysis process, and/or text analysis process. In some instances, the overarching threshold may be dynamic and may be periodically recomputed by the domain analysis platform 110 based on adjustments to a baseline dataset (e.g., the domain comparison records generated at step 207, or the like).

Referring to FIG. 2G, at step 225, the domain analysis platform 110 may establish a connection with the administrator computing device 160. In one or more instances, the domain analysis platform 110 may establish a third data connection with the administrator computing device 160 to link the domain analysis platform 110 to the administrator computing device 160.

At step 226, the domain analysis platform 110 may send, share, and/or otherwise provide the domain classification information determined at step 224 to the administrator computing device 160. In one or more instances, the domain analysis platform 110 may send, share, and/or otherwise provide the domain classification information to the administrator computing device 160 via the communication interface 113 and while the third data connection is established. In one or more instances, the domain analysis platform 110 may also send, share, and/or otherwise provide, along with the domain classification information, the one or more commands directing the administrator computing device 160 to cause display of a domain classification interface based on the domain classification information generated at step 224.

At step 227, the administrator computing device 160 may receive or otherwise access the domain classification information sent at step 226. In one or more instances, the administrator computing device 160 may receive the domain classification information while the third data connection is still established. In one or more instances, the administrator computing device 160 may also receive or otherwise access, along with the domain classification information, the one or more commands directing the administrator computing device 160 to cause display of a domain classification interface based on the domain classification information generated at step 224.

Figure 3:
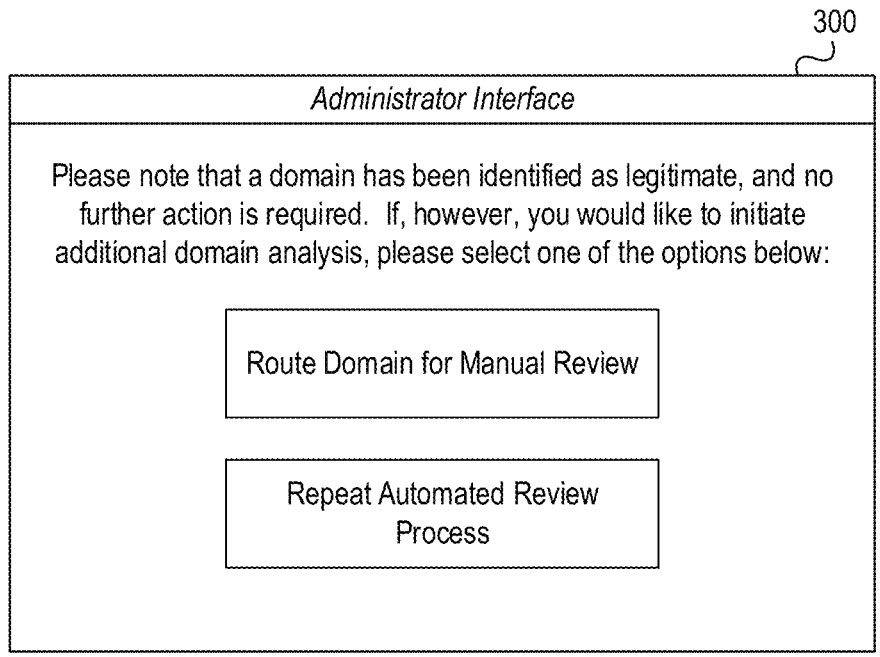
FIGS. 3-5 depict illustrative user interfaces for identifying legitimate websites and removing false positives from domain discovery analysis in accordance with one or more example embodiments.

At step 228, the administrator computing device 160 may generate and/or otherwise cause display of a domain classification interface. In one or more instances, in generating the domain classification interface, the administrator computing device 160 may cause display of a graphical user interface similar to graphical user interface 300, which is shown in FIG. 3. For example, graphical user interface 300 may indicate that the domain analysis platform 110 identified the first domain as legitimate, but may nevertheless provide options for further analysis in response to a user request. For example, the administrator computing device 160 may receive user input (e.g., from an employee of an organization associated with the domain analysis platform 110) indicating that the first domain should be routed for additional automated or manual review.

Referring to FIG. 2H, at step 229, the domain analysis platform 110 may generate one or more commands directing the domain identification system 130 to update a list of indeterminate domains to reflect that the first domain is a legitimate domain. At step 230, the domain analysis platform 110 may send, share, or otherwise provide the one or more commands directing the domain identification system 130 to update the list of indeterminate domains to the domain identification system 130. For example, the domain analysis platform 110 may send the one or more commands directing the domain identification system 130 to update the list of indeterminate domains to the domain identification system 130 in response to determining that the first domain is legitimate as described above. Additionally or alternatively, the domain analysis platform 110 may send the one or more commands directing the domain identification system 130 to update the list of indeterminate domains to the domain identification system 130 in response to receiving user input via the domain classification interface requesting that the commands be sent. In one or more instances, the domain analysis platform 110 may send, share, or otherwise provide the one or more commands directing the domain identification system 130 to update the list of indeterminate domains via the communication interface 113 and while the second data connection is still established.

At step 231, the domain identification system 130 may receive or otherwise access the one or more commands directing the domain identification system 130 to update the list of indeterminate domains. In one or more instances, the domain identification system 130 may receive or otherwise access the one or more commands directing the domain identification system 130 to update the list of indeterminate domains while the second data connection is established.

At step 232, the domain identification system 130 may remove the first domain name from a list of potentially indeterminate domains. In removing the first domain name from the list of potentially indeterminate domains, the domain identification system 130 may ensure that the first domain name is not identified for analysis (e.g., at step 208) at a future time. By dynamically adjusting datasets such as the list of potentially indeterminate domains, the domain identification system 130 improves domain analysis by minimizing false positive results (e.g., legitimate domains flagged as indeterminate and/or potentially malicious) that may otherwise be generated through the domain analysis process. As a result, the methods described herein provide technical advantages by reducing the processing burden (e.g., computing and/or manual resources) and costs (e.g., computing and/or monetary) that would otherwise be used in analyzing a surplus of false positive domains.

Referring to FIG. 2I, at step 233, the domain analysis platform 110 may receive and/or otherwise access an indication of a second domain for analysis. In one or more instances, the domain analysis platform 110 may receive the indication of the second identified domain via the communication interface 113 and while the second data connection is established. In one or more instances, actions performed at step 233 may be similar to those described above with regard to step 211.

At step 234, the domain analysis platform 110 may use the critical feature analysis module 112a to perform critical feature analysis of the second domain and to determine a legitimacy indication corresponding to the second domain. Actions performed at step 235 may be similar to those described above with regard to step 212.

At step 235, the domain analysis platform 110 may determine whether the legitimacy indication determined at step 234 exceeds the predetermined legitimacy threshold. In one or more instances, the predetermined legitimacy threshold may be the same threshold that was used by the domain analysis platform 110 at step 213 for analysis of the first domain. Actions performed at step 235 may be similar to those described above with regard to step 213. For illustrative purposes, however, and in contrast to step 213, it should be understood that at step 235 of the example event sequence, the domain analysis platform 110 may determine that the legitimacy indication does not exceed the predetermined legitimacy threshold. In some instances, where the domain analysis platform 110 determines that the legitimacy indication does not exceed the predetermined legitimacy threshold, the domain analysis platform 110 may proceed to step 246 without further analysis. In other instances, however, the domain analysis platform 110 may continue with further analysis of a domain (e.g., the second domain) even if the legitimacy indication does not exceed the predetermined legitimacy threshold. For example, the domain analysis platform 110 may determine that the legitimacy indication was within a predetermined error range of the predetermined legitimacy threshold and should be further analyzed. For illustrative purposes, the further analysis is shown with regard to this example event sequence.

At step 236, the domain analysis platform 110 may initiate a title analysis process using the title analysis module 112b, and may determine a first plurality of words associated with the second domain. For example, the domain analysis platform 110 may initiate analysis of the second domain using the techniques described above with regard to the first domain in step 214.

Referring to FIG. 2J, at step 237, the domain analysis platform may determine a second plurality of words associated with the second domain. For example, the domain analysis platform 110 may perform actions with regard to the second domain that are described above at step 215 with regard to the first domain.

At step 238, the domain analysis platform 110 may compare the first plurality of words associated with the second domain to the second plurality of words associated with the second domain to determine a title correlation indication for the second domain. Actions performed at step 238 with regard to the second domain may be similar to those described above at step 216 with regard to the first domain.

At step 239, the domain analysis platform 110 may compare the title correlation indication for the second domain to the predetermined title correlation threshold as described above with regard to step 217. It should be understood that in contrast to step 217 where the domain analysis platform 110 determined that, for the first domain, the title correlation indication exceeded the predetermined title correlation threshold, the domain analysis platform 110 may determine that the title correlation indication for the second domain does not exceed the predetermined title correlation threshold. In some instances, where the domain analysis platform 110 determines that the title correlation indication does not exceed the predetermined title correlation indication, the domain analysis platform 110 may proceed to step 246 without further analysis. In other instances, however, the domain analysis platform 110 may continue with further analysis of a domain (e.g., the second domain) even if the title correlation indication does not exceed the predetermined title correlation threshold. For example, the domain analysis platform 110 may determine that the title correlation indication was within a predetermined error range of the predetermined title correlation threshold and should be further analyzed. For illustrative purposes, the further analysis is shown with regard to this event sequence. Actions performed at step 239 may be similar to those described above in further detail with regard to step 217.

At step 240, the domain analysis platform 110 may use the structure analysis module 112c to initiate a structure analysis process for the second domain. In these instances, the domain analysis platform 110 may determine one or more feature vectors corresponding to an HTML tag structure of pages associated with the second domain. Actions performed at step 240 may be similar to those described above in further detail with regard to step 218.

Referring to FIG. 2K, at step 241, the domain analysis platform 110 may compare the one or more feature vectors corresponding to the second domain with the feature vectors of the domain comparison records generated at step 207. Actions performed at step 241 may be similar to those described above in further detail with regard to step 219.

At step 242, the domain analysis platform 110 may compare the one or more structure analysis values for the second domain to the predetermined structure analysis threshold values as described in step 220 with regard to the first domain. It should be understood that in contrast to step 220 where the domain analysis platform 110 determined that, for the first domain, the structure analysis values exceeded the predetermined structure analysis threshold values, the domain analysis platform 110 may determine that the structure analysis values for the second domain do not exceed the predetermined structure analysis threshold values at step 242 of the example event sequence. In some instances, where the domain analysis platform 110 determines that the structure analysis values do not exceed the predetermined structure analysis threshold values, the domain analysis platform 110 may proceed to step 246 without further analysis. In other instances, however, the domain analysis platform 110 may continue with further analysis of a domain (e.g., the second domain) even if the structure analysis values do not exceed the predetermined structure analysis threshold values. For example, the domain analysis platform 110 may determine that the structure analysis values are within a predetermined error range of the predetermined structure analysis threshold values and should be further analyzed. For illustrative purposes, the further analysis is shown with regard to this example event sequence.

At step 243, the domain analysis platform 110 may use the text analysis module 112*d* to initiate text analysis of the second domain and to generate key value pairs based on the second domain. Actions performed at step 243 may be similar to those described above with regard to the first domain at step 221.

At step 244, the domain analysis platform 110 may generate a text correlation score for the second domain. Actions performed at step 244 may be similar to those described above with regard to the first domain at step 222.

Referring to FIG. 2L, at step 245, the domain analysis platform 110 may compare the text correlation score for the second domain to the predetermined text correlation threshold as described above with regard to step 223. It should be understood that in contrast to step 223 where the domain analysis platform 110 determined that, for the first domain, the text correlation score exceeded the predetermined text correlation threshold, the domain analysis platform 110 may determine that the text correlation score for the second domain does not exceed the predetermined text correlation threshold.

At step 246, the domain analysis platform 110 may, in response to determining that the second domain failed one or more of the predetermined thresholds described above, generate domain classification information indicating that the second domain is indeterminate. In generating the domain classification information indicating that the second domain is indeterminate, the domain analysis platform 110 may generate information indicating that the second domain is a malicious domain. In other instances, in generating the domain classification information indicating that the second domain is indeterminate, the domain analysis platform 110 may generate information indicating that the second domain may be malicious, but that further investigation should be conducted prior to making the determination. Actions performed at step 246 may be similar to those described above with regard to step 224.

At step 247, the domain analysis platform 110 may send, share, and/or otherwise provide the domain classification information determined at step 246 to the administrator computing device 160. Actions performed at step 247 may be similar to those described above with regard to step 226.

At step 248, the administrator computing device 160 may receive or otherwise access the domain classification information sent at step 247. Actions performed at step 248 may be similar to those described above with regard to step 227.

Figure 4:
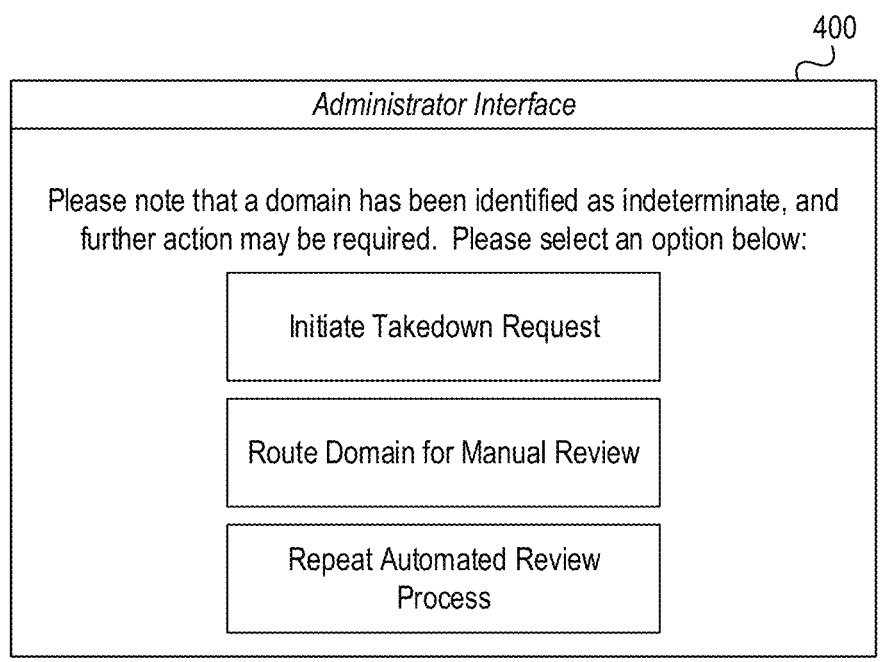

Referring to FIG. 2M, at step 249, the administrator computing device 160 may generate and/or otherwise cause display of a domain classification interface. In one or more instances, in generating the domain classification interface, the administrator computing device 160 may cause display of a graphical user interface similar to graphical user interface 400, which is shown in FIG. 4. For example, graphical user interface 400 may indicate that the domain analysis platform 110 identified the first domain indeterminate, and may provide options for further analysis. For example, the administrator computing device 160 may receive user input (e.g., from an employee of an organization associated with the domain analysis platform 110) indicating that the first domain should be routed for additional automated or manual review and/or a takedown request should be initiated. Actions performed at step 249 may be similar to those described above with regard to step 228.

At step 250, the domain analysis platform 110 may generate one or more commands directing the domain investigation computing system 150 to modify one or more stored domain investigation datasets based on the domain classification information generated at steps 224 and 246 for the first and second domains respectively. For example, the domain analysis platform 110 may generate one or more commands directing the domain investigation computing system 150 to remove the first domain from a list of domains that should be further investigated (e.g., because the domain investigation computing system 150 determined that the first domain was legitimate) and to add the second domain to the list of domains that should be further investigated (e.g., because the domain investigation computing system 150 determined that the second domain was indeterminate). In some instances, the domain analysis platform 110 may generate the one or more commands directing the domain investigation computing system 150 to remove the first domain from the list of domains that should be further investigated based on input received via a user interface (e.g., graphical user interface 400, or the like) and/or may generate other commands (e.g., to automatically initiate a takedown request, or the like) based on the received input.

At step 251, the domain analysis platform 110 may establish a connection with the domain investigation computing system. For example, the domain analysis platform 110 may establish a fourth data connection with the domain investigation computing system 150 to link the domain analysis platform 110 to the domain investigation computing system 150.

At step 252, the domain analysis platform 110 may send, share, or otherwise provide the one or more commands directing the domain investigation computing system 150 to modify the one or more stored domain investigation datasets to the domain investigation computing system 150. In one or more instances, the domain analysis platform 110 may send, share, or otherwise provide the one or more commands directing the domain investigation computing system 150 to modify the one or more stored domain investigation datasets via the communication interface 113 and while the fourth data connection is established.

Referring to FIG. 2N, at step 253, the domain investigation computing system 150 may receive or otherwise access the one or more commands directing the domain investigation computing system 150 to modify the one or more stored domain investigation datasets sent at step 252. In one or more instances, the domain investigation computing system 150 may receive or otherwise access the one or more commands directing the domain investigation computing system 150 to modify the one or more stored domain investigation datasets while the fourth data connection is established.

At step 254, the domain investigation computing system 150 may modify the stored domain investigation datasets based on the commands received at step 253. For example, in response to the commands, the domain investigation computing system 150 may remove the first domain from a list of domains that should be further investigated and add the second domain to a list of domains that should be further investigated. As a result, the domain analysis platform 110, the domain investigation computing system 150, and/or the other systems and devices described herein might not search and/or analyze the first domain in future iterations of the domain analysis process described herein, but they may nevertheless search and/or further analyze the second domain.

At step 255, the domain analysis platform 110 may generate one or more commands directing the enterprise user device 140 to cause display of an indeterminate domain alert based on the domain classification information for the second domain generated at step 246. At step 256, the domain analysis platform 110 may establish a connection with the enterprise user device 140. For example, the domain analysis platform 110 may establish a fifth data connection with the enterprise user device 140 to link the domain analysis platform 110 to the enterprise user device 140.

Referring to FIG. 2O, at step 257, the domain analysis platform 110 may send, share, or otherwise provide the one or more commands directing the enterprise user device 140 to cause display of the indeterminate domain alert. In one or more instances, the domain analysis platform 110 may send, share, or otherwise provide the one or more commands directing the enterprise user device 140 to cause display of the indeterminate domain alert via the communication interface and while the fifth data connection is established.

At step 258, the enterprise user device 140 may receive or otherwise access the one or more commands directing the enterprise user device 140 to cause display of the indeterminate domain alert. In one or more instances, the enterprise user device 140 may receive or otherwise access the one or more commands directing the enterprise user device 140 to cause display of the indeterminate domain alert while the fifth data connection is established.

Figure 5:
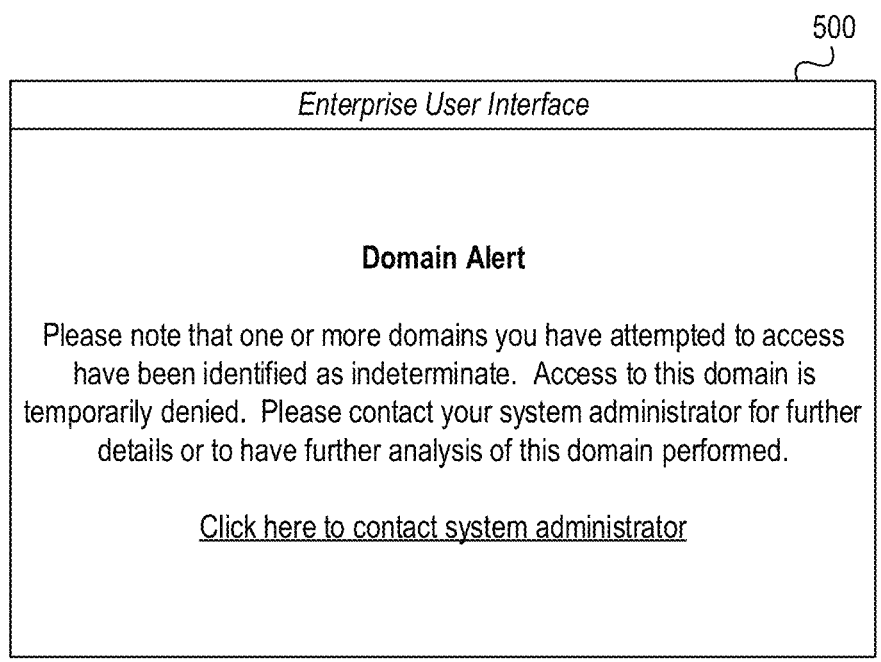

At step 259, the enterprise user device 140 may display the domain alert message. In some instances, the enterprise user device 140 may generate and display the domain alert message based on information received from the domain analysis platform 110 along with the one or more commands directing the enterprise user device 140 to cause display of the indeterminate domain alert. In other instances, the enterprise user device 140 may generate and display the domain alert message based on information stored at the enterprise user device 140. In displaying the domain alert message, the enterprise user device 140 may display a graphical user interface similar to graphical user interface 500, which is shown in FIG. 5. For example, enterprise user device 140 may display an alert that a domain that a user of the enterprise user device 140 attempted to access (e.g., the second domain) has been identified as indeterminate and that access is denied. In some instances, the enterprise user device 140 may also display a link to contact a system administrator (e.g., an employee of an organization affiliated with the domain analysis platform 110).

Figure 6:
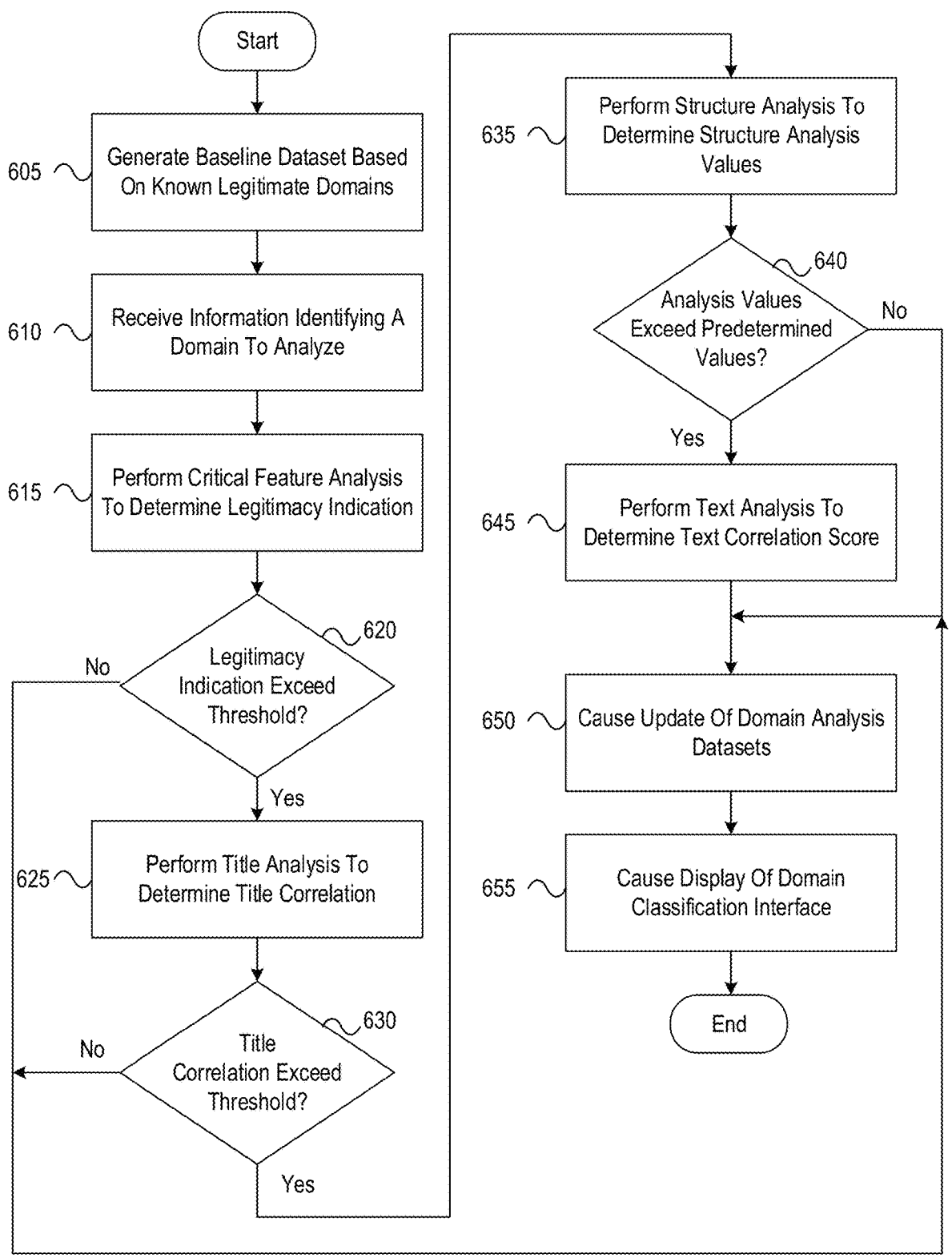
FIG. 6 depicts an illustrative method for identifying legitimate websites and removing false positives from domain discovery analysis in accordance with one or more example embodiments.

FIG. 6 depicts an illustrative method for identifying legitimate websites and removing false positives from domain discovery analysis in accordance with one or more example embodiments. Referring to FIG. 6, at step 605, a computing platform having at least one processor, a communication interface, and memory may generate a baseline dataset (including one or more feature vectors) based on known legitimate domains. At step 610, the computing platform may receive information identifying a domain to analyze. At step 615, the computing platform may perform critical feature analysis on the domain to determine a legitimacy indication. At step 620, the computing platform may compare the legitimacy indication to a predetermined legitimacy threshold. If the legitimacy indication does not exceed the predetermined legitimacy threshold, the computing platform may proceed to step 650. If the legitimacy indication exceeds the predetermined legitimacy threshold, the computing platform may proceed to step 625.

At step 625, the computing platform may perform a title analysis on the domain to determine a title correlation indication. At step 630, the computing platform may compare the title correlation indication to a predetermined title correlation threshold. If the title correlation indication does not exceed the predetermined title correlation threshold, the computing platform may proceed to step 650. If the title correlation indication exceeds the predetermined title correlation threshold, the computing platform may proceed to step 635.

At step 635, the computing platform may perform a structure analysis of the domain to determine one or more structure analysis values. At step 640, the computing platform may compare the structure analysis values to predetermined structure analysis threshold values. If the structure analysis values do not exceed the predetermined structure analysis threshold values, the computing platform may proceed to step 650. If the structure analysis values exceed the predetermined structure analysis threshold values, the computing platform may proceed to step 645.

At step 645, the computing platform may perform a text analysis for the domain to determine a text correlation score. At step 650, the computing platform may cause an update of one or more domain analysis datasets based on the analysis performed at steps 615-645. At step 655, the computing platform may cause display of a domain classification interface indicating whether the domain received at step 610 is a legitimate or indeterminate domain.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
determine feature vectors corresponding to a tag structure of one or more pages associated with a first domain;
compare the feature vectors corresponding to the tag structure to the feature vectors corresponding to known legitimate domains of a baseline dataset, resulting in one or more structure analysis values comprising averages of top-N similarity scores for a plurality of selected N values; and
based on determining that the one or more structure analysis values exceed one or more predetermined structure analysis threshold values, send one or more commands directing a domain identification system to remove the first domain from a list of indeterminate domains maintained by the domain identification system.

2. The computing platform of claim 1, wherein the memory stores additional computer-readable instructions that, when executed by the at least one processor, cause the computing platform to:
execute one or more machine learning algorithms to compare a first domain to a baseline dataset, wherein executing the one or more machine learning algorithms comprises performing the determination of the feature vectors and the comparison of the feature vector.

3. The computing platform of claim 2, wherein executing the one or more machine learning algorithms further comprises performing the determination that the one or more structure analysis values exceed the one or more predetermined structure analysis threshold values.

4. The computing platform of claim 3, wherein sending the one or more commands directing the domain identification system to remove the first domain from the list of indeterminate domains maintained by the domain identification system is based on execution of the one or more machine learning algorithms.

5. The computing platform of claim 2, wherein the memory stores additional computer-readable instructions that, when executed by the at least one processor, cause the computing platform to:
receive information identifying a second domain for analysis;
execute the one or more machine learning algorithms to compare the second domain to the baseline dataset;
based on the execution of the one or more machine learning algorithms, generate second domain classification information indicating that the second domain is an indeterminate domain; and
in response to determining that the second domain is an indeterminate domain, send one or more commands directing a domain investigation computing system to add the second domain to a list of domains for further investigation maintained by the domain investigation computing system.

6. The computing platform of claim 5, wherein the memory stores additional computer-readable instructions that, when executed by the at least one processor, cause the computing platform to:
generate one or more commands directing an administrator computing device to generate, based on the second domain classification information, a domain classification interface indicating that the second domain is an indeterminate domain; and
send, to the administrator computing device, the one or more commands directing the administrator computing device to generate the domain classification interface and the second domain classification information.

7. The computing platform of claim 2, wherein executing the one or more machine learning algorithms to compare the first domain to the baseline dataset comprises:
analyzing one or more of: WHOIS registration information, HTTP response size, a website template corresponding to the first domain, or an age of the first domain, wherein the analysis results in generation of a legitimacy indication; and
determining that the legitimacy indication exceeds a predetermined legitimacy threshold.

8. The computing platform of claim 7, wherein executing the one or more machine learning algorithms to compare the first domain to the baseline dataset comprises:
in response to determining that the legitimacy indication exceeds the predetermined legitimacy threshold, determining a first plurality of words corresponding to the first domain, wherein the first plurality of words includes one or more of: synonyms of the words corresponding to the first domain or categories of the words corresponding to the first domain;

determining a second plurality of words included in Hypertext Markup Language (HTML) source code corresponding to the first domain;

comparing the first plurality of words to the second plurality of words, wherein the comparison results in a title correlation indication, based on one or more of: synonym-based analysis or category-based analysis, between the first plurality of words and the second plurality of words; and determining that the title correlation indication exceeds a predetermined title correlation threshold.

9. The computing platform of claim 7, wherein executing the one or more machine learning algorithms to compare the first domain to the baseline dataset comprises:

in response to determining that the one or more structure analysis values exceed the one or more predetermined structure analysis threshold values, extracting text from one or more pages corresponding to the first domain;

determining, based on the text extracted from the one or more pages corresponding to the first domain, a key value pair for each word contained in the text extracted from the one or more pages corresponding to the first domain;

comparing the key value pairs to one or more of: a name of the first domain, text associated with the first domain, social media pages linked to the first domain, or a set of key value pairs associated with the known legitimate domains, wherein the key value comparison results in generation of a text correlation score; and determining that the text correlation score exceeds a predetermined text correlation threshold.

10. The computing platform of claim 9, wherein the key value pair for each word contained in the text extracted from the one or more pages corresponding to the first domain comprises a word and a weight value associated with the word, and wherein the weight value indicates an importance of the word to determining that the first domain is legitimate.

11. The computing platform of claim 10, wherein the weight value is automatically generated by the computing platform.

12. The computing platform of claim 2, wherein the memory stores additional computer-readable instructions that, when executed by the at least one processor, cause the computing platform to:

based on execution of the one or more machine learning algorithms, generate first domain classification information indicating that the first domain is a legitimate domain, wherein sending the one or more commands directing the domain identification system to remove the first domain from the list of indeterminate domains maintained by the domain identification system is in response to determining that the first domain is a legitimate domain.

13. The computing platform of claim 1, wherein the memory stores additional computer-readable instructions that, when executed by the at least one processor, cause the computing platform to:

in response to determining that the first domain is a legitimate domain, send one or more commands directing a domain investigation computer system to remove the first domain from a list of domains for further investigation.

14. The computing platform of claim 1, wherein the first domain is identified in response to a user request to access the first domain.

15. The computing platform of claim 1, wherein the first domain is identified based on one or more of: fuzzy matching techniques or identified misspelling.

16. The computing platform of claim 1, wherein the memory stores additional computer-readable instructions that, when executed by the at least one processor, cause the computing platform to:

generate, based on a list of known legitimate domains, the baseline dataset, wherein the baseline dataset comprises feature vectors corresponding to the known legitimate domains; and receive information identifying the first domain for analysis.

17. The computing platform of claim 16, wherein the list of known legitimate domains is updated to include the first domain in response to determining that the first domain comprises a legitimate domain.

18. The computing platform of claim 1, wherein the tag structure comprises a HyperText Markup Language (HTML) tag structure.

19. A method, comprising:

at a computing platform comprising at least one processor, a communication interface, and memory:

determining feature vectors corresponding to a tag structure of one or more pages associated with a first domain;

comparing the feature vectors corresponding to the tag structure to the feature vectors corresponding to known legitimate domains of a baseline dataset, resulting in one or more structure analysis values comprising averages of top-N similarity scores for a plurality of selected N values; and based on determining that the one or more structure analysis values exceed one or more predetermined structure analysis threshold values, sending one or more commands directing a domain identification system to remove the first domain from a list of indeterminate domains maintained by the domain identification system.

20. One or more non-transitory computer-readable media storing instructions that, when executed by a computing platform comprising at least one processor, a communication interface, and memory, cause the computing platform to:

determine feature vectors corresponding to a tag structure of one or more pages associated with a first domain;

compare the feature vectors corresponding to the tag structure to the feature vectors corresponding to known legitimate domains of a baseline dataset, resulting in one or more structure analysis values comprising averages of top-N similarity scores for a plurality of selected N values; and based on determining that the one or more structure analysis values exceed one or more predetermined structure analysis threshold values, send one or more commands directing a domain identification system to remove the first domain from a list of indeterminate domains maintained by the domain identification system.

* * * * *